(12) United States Patent
Nakanishi

(10) Patent No.: US 6,927,527 B2
(45) Date of Patent: Aug. 9, 2005

(54) ACTUATOR

(75) Inventor: Hideaki Nakanishi, Osaka (JP)

(73) Assignee: Minolta Co., Ltd., Osaka (JP)

( * ) Notice: Subject to any disclaimer, the term of this patent is extended or adjusted under 35 U.S.C. 154(b) by 22 days.

(21) Appl. No.: 10/449,534

(22) Filed: Jun. 2, 2003

(65) Prior Publication Data

US 2004/0178699 A1 Sep. 16, 2004

(30) Foreign Application Priority Data

Mar. 10, 2003 (JP) ........................................ 2003-063988

(51) Int. Cl.⁷ ............................................. H01L 41/08
(52) U.S. Cl. .................................. 310/323.02; 310/328
(58) Field of Search ....................... 310/323.02, 323.12, 310/323.16, 328

(56) References Cited

U.S. PATENT DOCUMENTS

| 4,950,135 | A | * | 8/1990 | Tojo et al. | ............... | 417/410.5 |
| 6,201,340 | B1 | * | 3/2001 | Matsuda et al. | ............ | 310/328 |
| 6,469,417 | B2 | * | 10/2002 | Shibatani | ............... | 310/316.01 |
| 6,657,362 | B2 | * | 12/2003 | Matsuo et al. | ......... | 310/323.02 |
| 6,771,004 | B1 | * | 8/2004 | Matsuda et al. | ............ | 310/328 |

FOREIGN PATENT DOCUMENTS

| JP | 6-38873 | 10/1985 |
| JP | 08-289573 | 11/1996 |
| JP | 10-225151 | 8/1998 |
| JP | 11-069852 | 3/1999 |
| JP | 2001-054289 | 2/2001 |

* cited by examiner

*Primary Examiner*—Mark Budd
(74) *Attorney, Agent, or Firm*—McDermott Will & Emery LLP

(57) ABSTRACT

An actuator is disclosed which has a driving section driven by means of electro-mechanical displacing members such as a piezoelectric members. The electro-mechanical displacing members are connected to a driving piece at one ends thereof and the driving piece is driven by the composition of displacements of the electro-mechanical displacing members. The movement of the driving piece is transmitted to a driven section. The electro-mechanical displacing members are also connected to a base member at the other ends thereof. A restraining member restrains unnecessary movement of the actuator which is composed of the electro-mechanical displacing members, the driving piece and the base member, thereby insuring stable operation of the actuator.

20 Claims, 18 Drawing Sheets

ACTUATOR

This application is based on patent application No. 2003-063988 filed in Japan, the contents of which are hereby incorporated by references.

BACKGROUND OF THE INVENTION AND RELATED ART

The present invention relates to an actuator having a driving section driven by means of electro-mechanical displacing members such as a piezoelectric members, and a driven section driven by the driving section with its driving force being transmitted from the driving section.

A Japanese before-examination publication of a patent application, a publication number 2001-54289 discloses an actuator having a pair of piezoelectric members arranged orthogonally with each other, and a displacement composing member or driving piece provided at the meeting position of the piezoelectric members to be driven by the composition of the displacements of the piezoelectric members and move in a given orbit, with the movement of the displacement composing member or driving piece being transmitted, by friction therebetween, to a driven section to drive the latter in a predetermined direction.

FIG. 19 schematically illustrates a conventional actuator of the type as mentioned above. As seen in FIG. 19, the conventional actuator 700 comprises a pair of laminated type piezoelectric members 101 and 102, which are orthogonally arranged with each other, and a tip member 103 connected by adhesion to one ends of piezoelectric members 101 and 102 at the meeting position or point of the latter two. The other ends of the piezoelectric members 101 and 102 are respectively adhered to a base member 104. The driving section 110 composed of the piezoelectric members 101 and 102, the tip member 103 and the base member 104, is urged by an urging section 130 such that the tip member 103 is in press contact with a rotor 120. The urging section 130 is composed of a pair of torsion coil springs 130 and 130, each of which has a pair of arms abutting against the base member 104 to secure the position of the driving section 110.

In the conventional actuator 700, driving signals are applied to the piezoelectric members 101 and 102 with different phases so that the tip member 103 at the meeting position of the piezoelectric members 101 and 102 is driven to move in a predetermined elliptic orbit. The base member 104 is made of elastic material so that the vibration or oscillation of one of the piezoelectric members 101 and 102 is transmitted to the other of the piezoelectric members 101 and 102 through the base member 104. While the tip member 103 is driven to move in an elliptic orbit, the tip member 103 is brought into contact with the rotor 120 for a given range of the orbit, and the rotor 120 is rotated in a predetermined direction by the frictional force acting between the tip member 103 and the rotor 120. A shaft 121 is integrally connected or formed with the rotor 120 to rotate therewith, and is used as an output shaft to be connected with outside device through a link or lever or other transmission which in turn is interconnected or interlocked with a pin fixed on the shaft or a plane of the rotor that is perpendicular to the shaft.

FIG. 20 schematically illustrates another conventional actuator 800 using the same reference numerals for the parts and components that are the same or corresponding to parts and components shown in FIG. 19. With reference to FIG. 20, the actuator 800 is provided with a driving section 110 which is substantially the same in construction as that shown in FIG. 19. The base member 104 is urged by an urging section 230 to make the tip member 103 be in contact with the rotor 120. The urging section 230 comprises a compression coil spring urging the base member at its one end portion, while the other end portion of the base member 104 is supported by a fixed member 240. Accordingly, the driving section 110 makes pivotal movement around a fulcrum at a point on the base member 104, thereby driving the tip member 103 to move in an elliptic orbit. The operation of the actuator 800 shown in FIG. 20 is substantially the same as that of the actuator 700 shown in FIG. 19.

When an excessive external force is applied to the rotor 120 of the actuator 700 shown in FIG. 19, the driving section 110 which is in frictional contact with the rotor 120 is likely to swing greatly and the wires connected with the piezoelectric members are likely to break, and the swing of the driving section may affect the accuracy of the driving of the actuator.

In the actuator 800 shown in FIG. 20, the base member 104 also oscillates as an elastic member so that the oscillating state of entire driving section 110 is likely to be affected by the oscillation of the base member 104. In addition, as the construction of the driving section 110 and the urging section 230 is not symmetric with respect to a central line of the driving section 110, the elliptic orbit in which the tip member 103 moves, is different in shape with the direction of driving of the rotor 120, resulting in difference or variation in the operational characteristics of the actuator 800 such as the rotational speed of the rotor 120.

SUMMARY OF THE INVENTION

Accordingly, an object of the present invention is to provide an actuator which is stable in operation.

Another object of the present invention is to provided an actuator which is reliable in operation.

Still another object of the present invention is to provide an actuator in which unnecessary swing of a driving section of the actuator is restrained.

To attain one or more of the above-mentioned objects, the actuator according to the present invention comprises a driving section including a plurality of electro-mechanical displacing sections for respectively electro-mechanically generating predetermined displacements, a composing section connected to one ends of the displacing sections for composing the displacements of the displacing sections, and a fixing section for fixing the other ends of the displacing sections; a driven section driven by the driving force transmitted from the driving section; an urging section for making press contact between the driving section and driven section; and a restraining member for preventing the driving section from moving in the direction in which the driven section is driven, the fixing section deforming with the displacements of the displacing sections, the restraining section being arranged at the position or in the vicinity of the position where the amount of the deformation of the fixing section is minimum.

According to an embodiment of the present invention, an actuator comprises a driving section including a pair of piezoelectric members respectively having elongated shape, each piezoelectric member being displaceable in response to electric signal applied thereto, a tip member connected to one ends of the piezoelectric members to be driven by the piezoelectric members by the composition of the displacements of the piezoelectric members, and a base member connected with the other ends of the piezoelectric members; a driven section driven by the driving force transmitted from the driving section through the tip member; an urging section for making press contact between the tip member and driven section; and a restraining member for preventing the driving section from moving in the direction in which the driven section is driven, the base member being deformable with the displacements of the piezoelectric members, the restraining member being arranged at the position or in the vicinity of the position where the amount of the deformation of the base member is minimum.

The above and further objects and novel features of the invention will more fully appear from the following detailed description wherein the same is read in connection with the accompanying drawing. It is to be expressly understood, however, that the drawing is for purpose of illustration only and is not intended as a definition of the limits of the invention.

DETAILED DESCRIPTION OF PREFERRED EMBODIMENTS

First Embodiment

Figure 1:
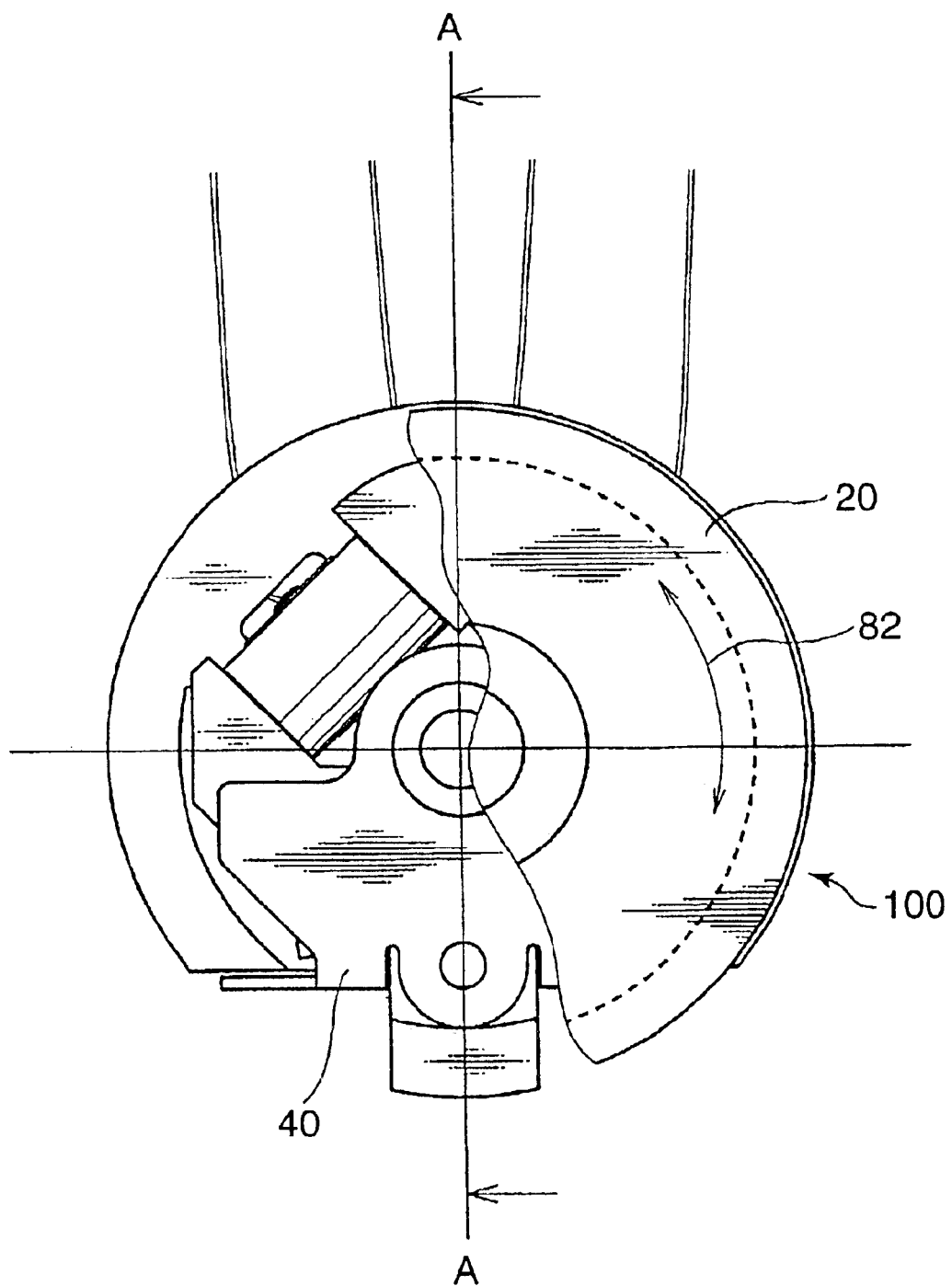
FIG. 1 is a partially broken away plan view of an actuator according to a first embodiment of the present invention.
Figure 2:
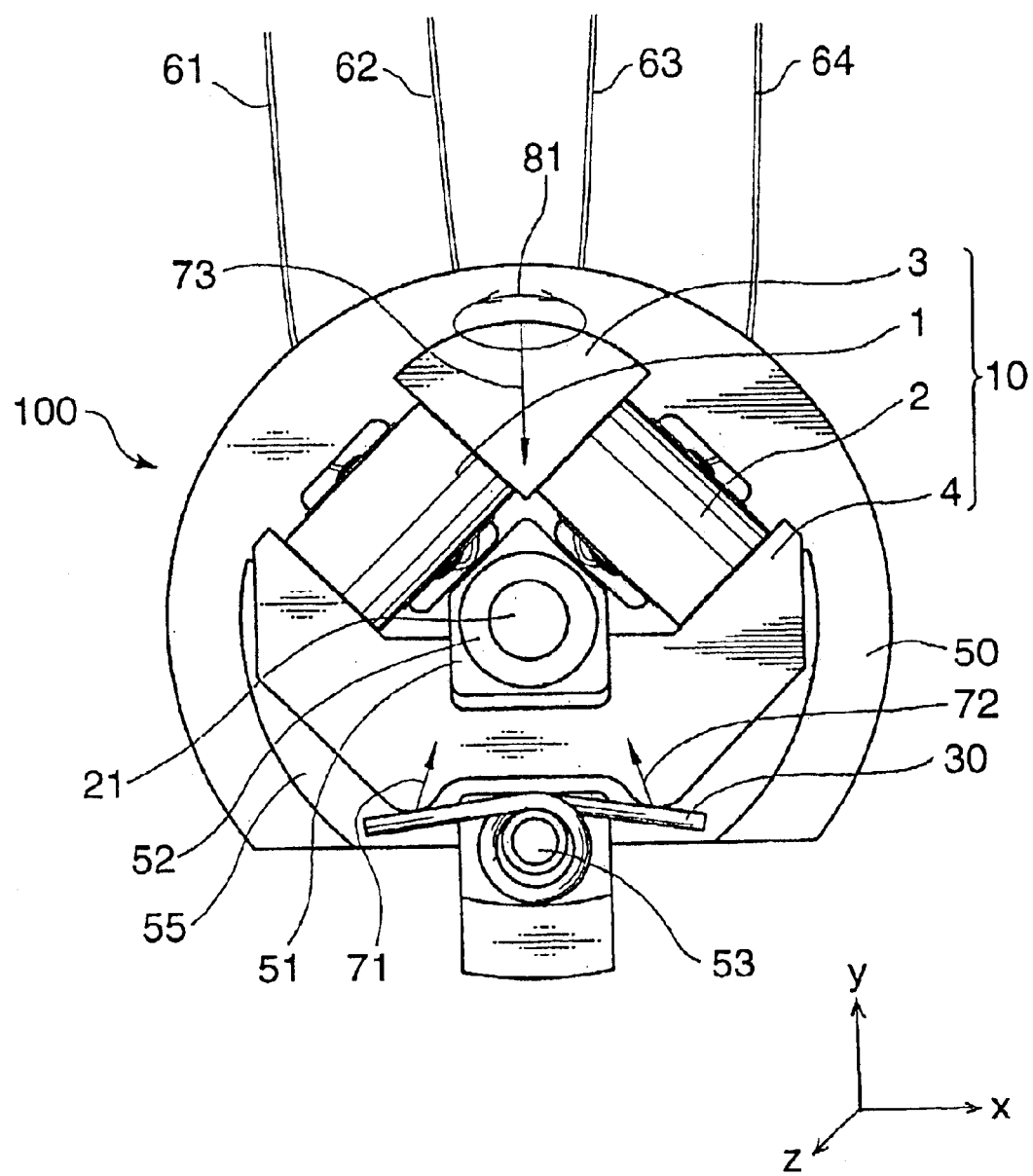
FIG. 2 is a plan view of the actuator of the first embodiment with its driven section and restraining member being removed.
Figure 3:
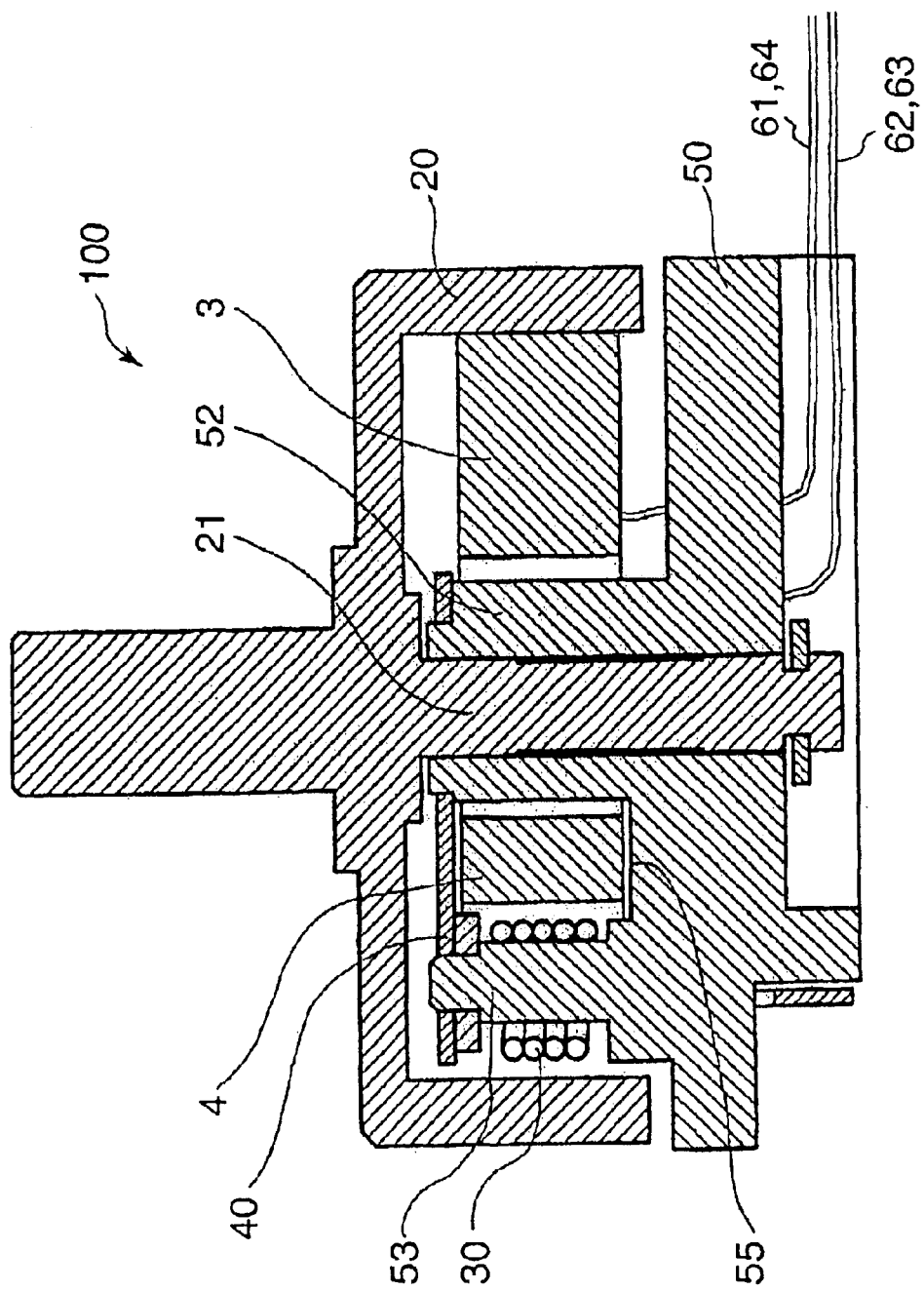
FIG. 3 is a sectional view of the actuator taken on line A—A in FIG. 1.

Explanation will be made about a first embodiment of the present invention with reference to FIGS. 1 through 3 wherein FIG. 1 is a partially broken away plan view of an actuator according to a first embodiment of the present invention, FIG. 2 is a plan view of the actuator of the first embodiment with its driven section and restraining member being removed, and FIG. 3 is a sectional view of the actuator taken on line A—A in FIG. 1. In FIG. 2, x axis shows the direction in which a driven section is driven at an contact point where the driven section is in contact with a tip member. "y" axis shows the direction passing through the contact point and an axis of rotation of the driven section. "z" axis shows the direction of axis of rotation of the driven section.

Referring to FIGS. 1 through 3, the actuator 100 is composed of a driving section 10 for driving a driven section 20, urging section 30 for urging the driving section against the driven section 20, a restraining member 40 for restraining the movement of the driving section 10 in the direction of z axis shown in FIG. 2, and a holder 50 for supporting the driving section 10. The driving section 10 is composed of a pair of electro-mechanical displacing members 1 and 2 meeting, for example, at right angles; a tip member 3 adhered to the tips of the displacing members 1 and 2 at their meeting positions; and a base member 4 adhered to the base ends of the displacing members 1 and 2.

For each of the displacing members 1 and 2 is employed a laminated type piezoelectric member which converts electric signal into mechanical displacement by piezoelectric effect. Accordingly, the displacing members 1 and 2 are referred to as a first piezoelectric member 1 and a second piezoelectric member 2 herein after in the description of the embodiments of the invention, although the displacing members may take other forms. The tip member 3 is made of metallic material, such as tungsten or tungsten carbide, which has high friction coefficient and has high durability against wearing-out. The base member 4 is made of metallic material, such as stainless steel or tungsten carbide, which can be easily manufactured. For the adhesion between the tip member 3 and each piezoelectric member 1 or 2 and between the base member 4 and each piezoelectric member 1 or 2 is employed appropriate adhesive suitable for the materials of the tip member 3 and the base member 4, such as adhesive of epoxy resin material which is superior in strength and adhesive strength.

Explanation will be made in more detail here with respect to the laminated type piezoelectric member. The piezoelectric member is composed of a plurality of ceramic sheets and electrode sheets which are alternatively laminated or stacked one on another with the ceramic sheets and the electrode sheets being rigidly adhered with one another. The electrode sheet between each pair of adjacent ceramic sheets is connected to a power supply through a signal line. When a predetermined voltage is applied to the ceramic sheets, an electric field is generated, in the direction of the lamination, across each ceramic sheets sandwiched between each pair of adjacent electrode sheets, with the direction of the electric field being the same with every other sheets. In other words, the ceramic sheets are laminated such that the polarization is the same with every other sheets, and that the polarization is opposite with adjacent sheets. Protective layers are provided on opposite end planes of the piezoelectric member.

When a DC driving voltage is applied, by the power supply, between each adjacent pair of electrode sheets, all the ceramic sheets expand or contact in the same direction, and the entire body of the piezoelectric member expands or contracts. When an AC driving voltage or AC signal is applied by the power supply between each adjacent pair of electrode sheets, each ceramic sheet repeats expanding and contracting in the same direction in accordance with the electric field applied thereto, and the entire body of the piezoelectric member repeats expanding and contracting. A piezoelectric member generally has its own resonance frequency which is determined by the structure and electric characteristics of the piezoelectric member. When the frequency of the AC voltage coincide with the resonance frequency, the impedance of the piezoelectric member decreases and the displacement of the piezoelectric member increases. As a piezoelectric member generally shows small amount of displacement per its outside size, it is preferable to make use of the resonance phenomena in order to drive the piezoelectric member with low voltage.

The driving section 10 is slidably supported by the restraining member 51 formed on the holder 50. The base member 4 has two planes which are perpendicular to the x axis (see FIG. 2), and the restraining member 51 is formed with smooth and parallel side planes respectively facing the two planes of the base member 4. The base member 4 is supported to move only in the yz plane (see FIG. 2) relative to the holder 50 with the planes of the base member 4 and restraining member 51 being in slidable contact with each other. As the need arises, friction lowering or reducing material is coated on the contact planes of the base member 4 and the restraining member 51 such that the base member 4 and the restraining member 51 slide each other with low friction. Grease or the like may be used as the friction lowering material.

The urging section 30 is composed, for example, of a torsion coil spring having its coil portion fitting on a spring guide post or pin 53 and two arms abutting against bottom end portion of the base member 51 to urge the base member 51 in the directions as shown by the arrows 71 and 72 in FIG. 2. As a result, the driving section 10 is pressed against inner side of the driven section 20 with a given pressure, receiving, from the driven section, a force as shown by an arrow 73 in FIG. 2. It is to be noted that the directions of the arrows in FIG. 2 show directions in which forces act, while the lengths of the arrows show the amounts of the forces, and the same applies through the explanation of the embodiments.

The driven section 20 has a form of cylindrical or reverse-cup-shaped rotor in the first embodiment, and is made of metal material such as aluminum. Surface treatment such as alumite treatment is applied on the surface of the rotor 20 where the tip member 3 is in contact with, in order to prevent wearing-out of the surface by the contact with the tip member 3. The rotor 20 is rotated in the clockwise or counter clockwise direction as shown by double headed arrow 82 (see FIG. 1) around the rotational shaft 21 by means of the elliptic motion of the tip member 3 and the friction caused between the tip member 3 and the rotor 20 by the urging force shown by an arrow 73. The rotary shaft 21 is rotatably supported by a shaft supporter 52 which is provided on the holder 50. The shaft supporter 52 may take a form of a sliding bearing or a rolling bearing.

The driving section 10 is sandwiched between an abutting plane 55 of the holder 50 and the restraining member 40 and is restrained from moving in the direction of the rotational axis. The electric power is supplied to the driving section 10 through lead wires 61 through 64 which are connected with the electrode sheets of the pair of the piezoelectric members 1 and 2, and which are derived out through holes formed on the holder 50.

Then, explanation will be made about the principle of the rotational operation of the rotor 20. When driving signals having predetermined different phases are applied to the first and second piezoelectric members 1 and 2, the first and second piezoelectric members 1 and 2 are driven with different phases, and the tip member 3 attached to the piezoelectric members 1 an 2 at their meeting position is driven in a predetermined elliptic orbit. It is to be noted that the term "elliptic orbit" includes circular orbit. In other words, the tip member may be driven in a circular orbit. While the tip member 3 being driven in the elliptic orbit, the tip member 3 is in contact with the inner side of the rotor 20 for a given range of the orbit and the rotor 20 is driven in a predetermined direction by means of the friction acting between the tip member 3 and the inner side of the rotor 20. If the direction of the shifting of the phases of the driving signals is reversed, the tip member 3 moves in the reverse direction in the elliptic orbit to rotate the rotor 20 in the reverse direction. The elliptic movement of the tip member 3 is obtained, according to equation of elliptic oscillation (equation of Lissajous), from the composition of independent movements of two members which meet at right angles.

The embodiment described above employs two phase driving wherein driving signals of different phases are applied to the first and second piezoelectric members 1 and 2 to drive the piezoelectric members 1 and 2 at different phases. The present invention is not limited to that type of driving, but may employ a single phase driving wherein either one of the piezoelectric members is driven by an electric signal with the other piezoelectric member following the electrically driven piezoelectric member. For example, only the first piezoelectric member 1 is driven by an electric signal with its oscillation being transmitted to the second piezoelectric member 2 via the base member 4 to make the second piezoelectric member 2 resonate. Then, the tip member attached to the meeting point of the first and second piezoelectric members 1 and 2 is driven in an elliptic (including circular) orbit.

The tip member 3 and the rotor 20 are seen to make line contact with each other in the Figures. However, practically, they make face contact with each other for a certain extent. The position of the contact between the tip member 3 and the rotor 20 changes with the rotation of the rotor 20 due to errors in the production of components, especially the run-out and out-of-roundness. Accordingly, fluctuation of the frictional force is likely to occur unless the state of the contact is maintained stably between the tip member 3 and the rotor 20. The fluctuation of the friction may result in irregularity of the rotation of the rotor 20, and the rotor 20 is not driven stably. However, according to the embodiment described above, the restraining member 51 holds the driving section 10 allowing its movement only in the yz plane shown in FIG. 2. Accordingly, the tip member 3 is maintained to be in contact with the rotor 20 under the action of the urging section 30 even if the position of the contact between the tip member 3 and the rotor 20 shifts. In the case where the urging section is in the form of spring, it is preferable to make the spring constant as small as possible such that the fluctuation of the urging force is small irrespectively of the shifting of the position of the contact.

In this way, the driving section 10 of the actuator 1 is prevented from swinging unexpectedly, since the driving section 10 is restrained from moving in the direction of driven movement of the driven section 20, by means of the restraining member 51 which is arranged at the position or in the vicinity of the position where the amount of deformation of the base member 4 is minimum.

In the actuator 100 of the embodiment, the restraining member 51 prevents the movement of the driving section 10 in the direction of x axis so that unnecessary swinging of the driving section 10 is suppressed to prevent energy loss, variation of stop position of the rotor 20 and breaking of the lead wire due to its bending even when the direction of the frictional force is reversed due to the reversal of the driving direction of the rotor 20 or an external force is applied to the actuator 100.

In the embodiment described above, the retraining member 51 is integrally formed with the shaft supporter 52 and arranged to surround the shaft supporter 52. Such arrangement makes compact and highly dense the actuator of the type that performs rotational driving motion and in which driving section 10 is arranged within the driven section as in the case of the first embodiment.

Still further, according to the first embodiment, the restraining member 51 formed integrally with the shaft supporter 52 is arranged between the tip member 3 and the base member 4 to make use of the dead space within the driving section, thereby saving the space occupied by the components of the actuator. At the same time, the driving section 10, especially the first and second piezoelectric members 1 and 2 may be made larger relative to the entire size of the actuator 100 so that the actuator according to the embodiment can operate at high speed with high output power.

Although the driven section 20 has a cylindrical form rotatable multiple of turns, the driven section may be of arc or sectional form which is a section of a cylinder or a ring, when the driven section is required to move angularly for some degrees e.g. for a fraction of a circle.

In the embodiment, the tip member 3 of the driving section 10 is in pressing contact with the inner side of the rotor of the driven section 20. The present invention is not limited to that structure, but may take various forms. For example, the tip member 3 of the driving section 10 may be in pressing contact with the outer side of the rotor or other member of the driven section. In this case, the same effect as that attained by the first embodiment can be attained.

(Second Embodiment)

Figure 4:
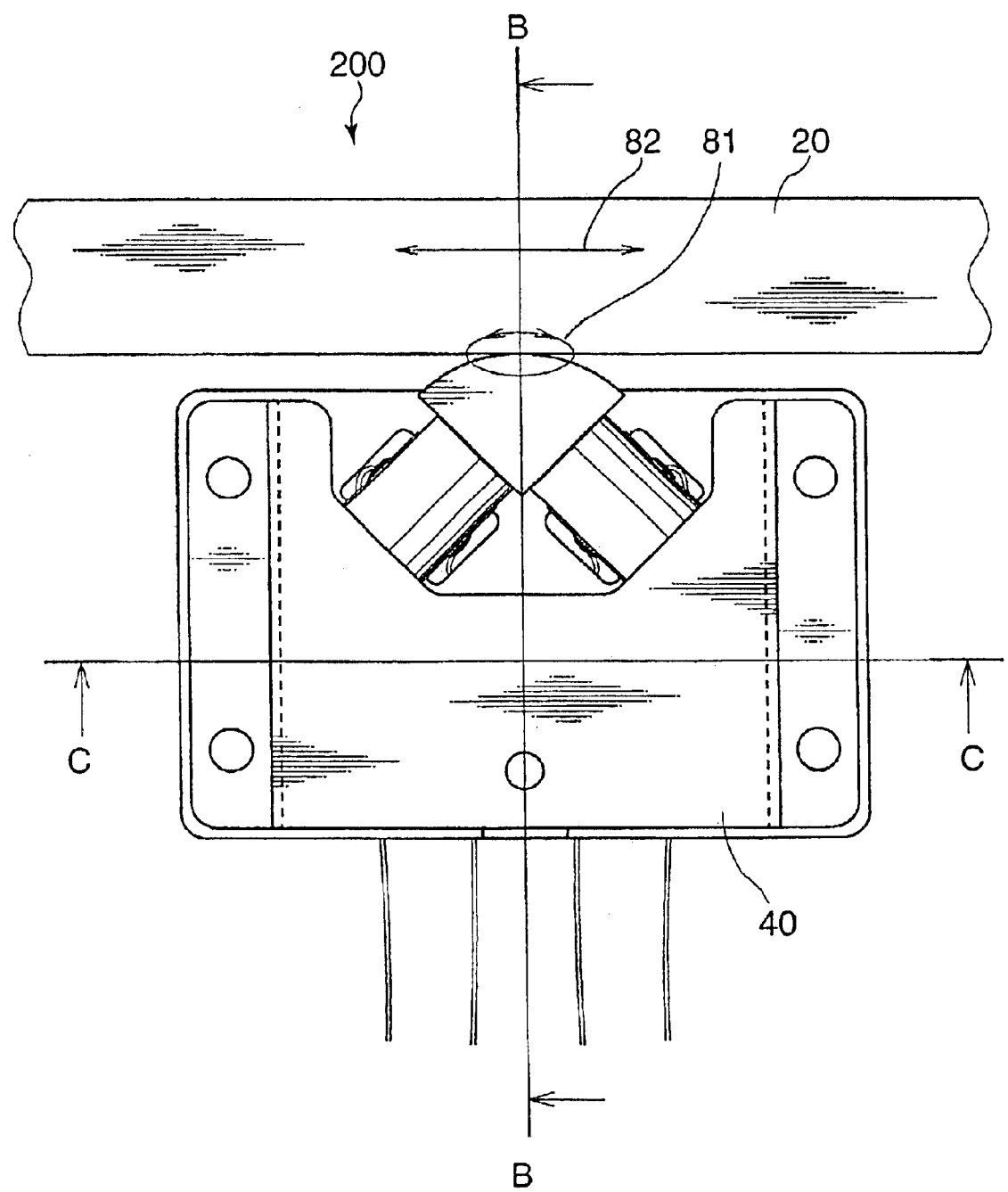
FIG. 4 is a partially broken away plan view of an actuator according to a second embodiment of the present invention.
Figure 5:
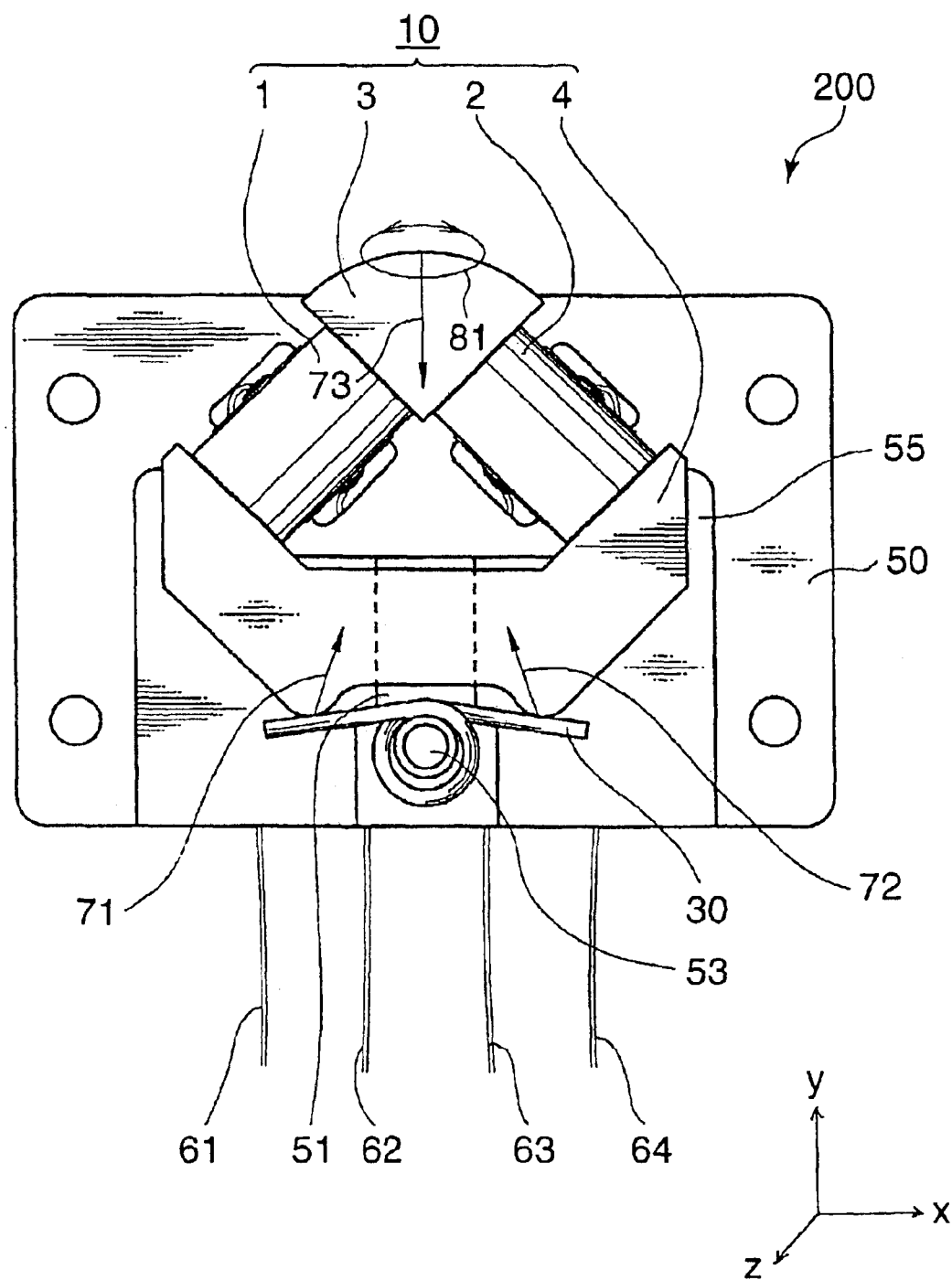
FIG. 5 is a plan view of the actuator of the second embodiment with its driven section and restraining member being removed.
Figure 6:
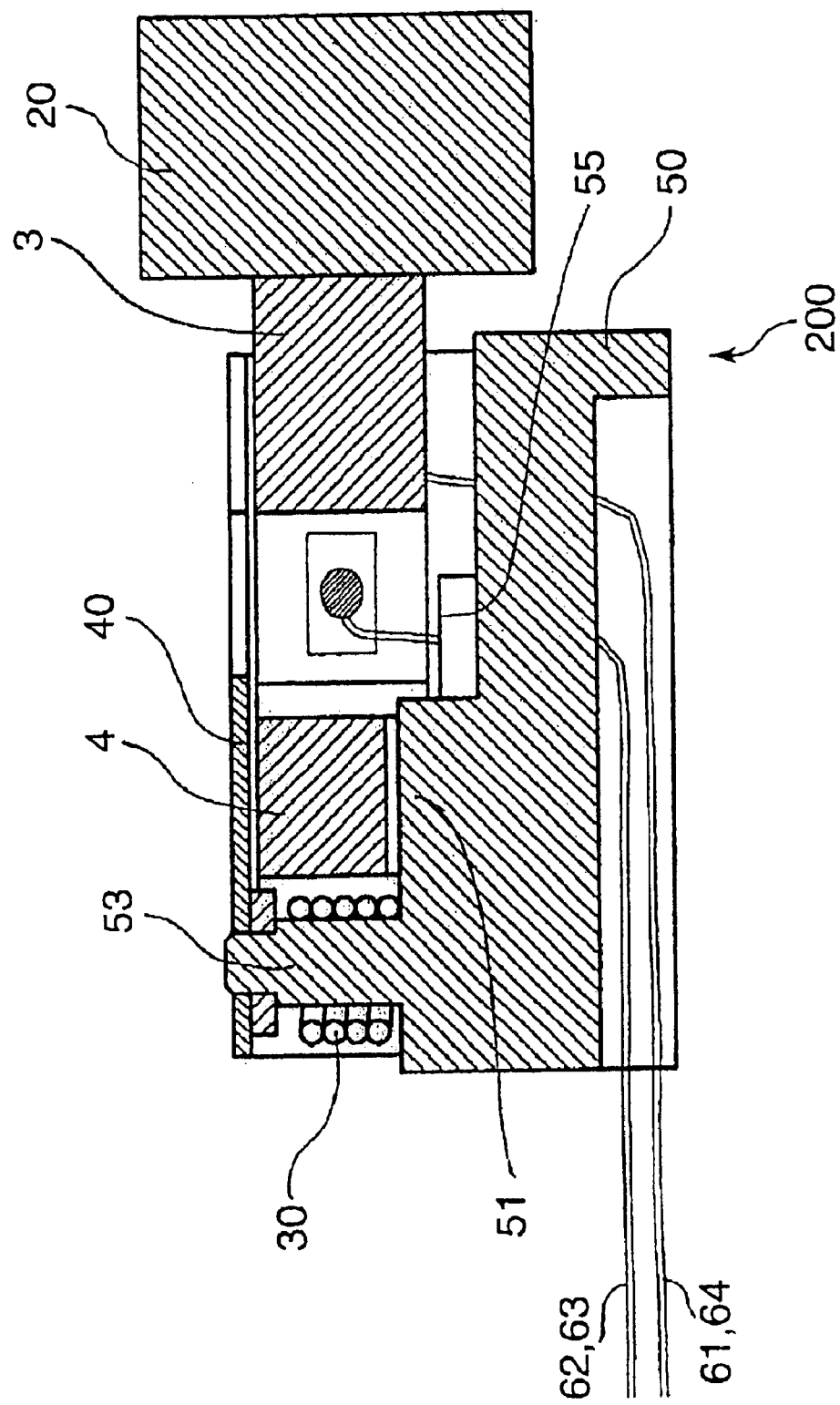
FIG. 6 is a sectional view of the actuator taken on line B—B in FIG. 4.
Figure 7:
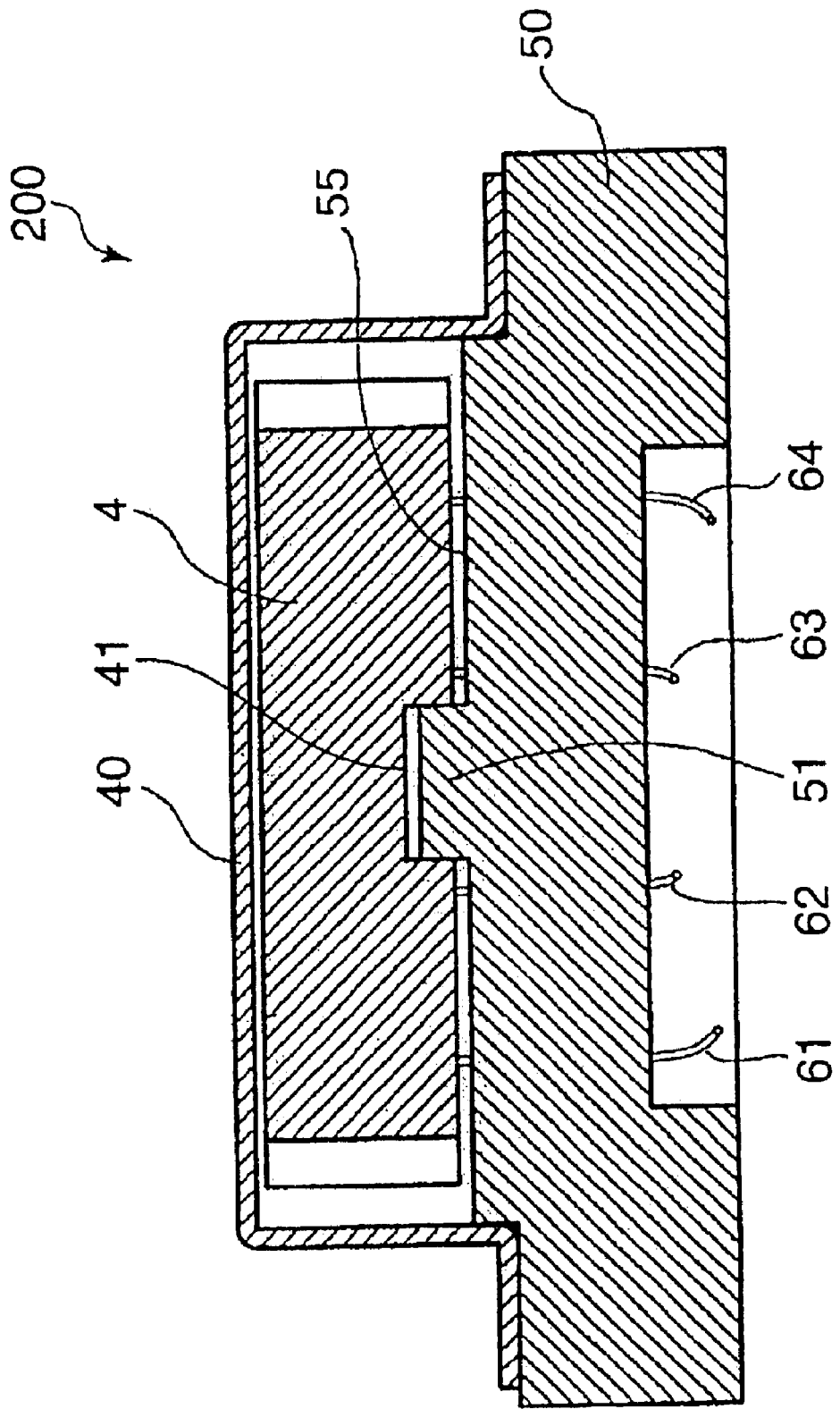
FIG. 7 is a sectional view of the actuator taken on line C—C in FIG. 4.

Referring to FIGS. 4 through 7, explanation will be made about an actuator according to a second embodiment of the present invention. FIG. 4 is a partially broken away plan view of an actuator according to a second embodiment of the present invention. FIG. 5 is a plan view of the actuator of the second embodiment with its driven section 20 and restraining member 40 being removed. FIG. 6 is a sectional view of the actuator taken on line B—B in FIG. 4. FIG. 7 is a sectional view of the actuator taken on line C—C in FIG. 4. In FIG. 5, x axis shows the direction in which a driven section is driven. "y" axis shows the direction in which the driving section is in contact with the driven section. "Z" axis shows the direction perpendicular to the plane of the driving section 10. In the second embodiment, the driven section 20 is driven linearly while the driven section 20 is rotated in the first embodiment. In FIGS. 4 through 7, the same or like reference numerals are used for the parts or members which are the same or correspond to the parts or members shown in FIGS. 1 through 3, and explanation will be made in the followings only for the portions or structures of the second embodiment that are different from those of the first embodiment.

The driving section 10 is slidably supported by the restraining member 51 formed on the holder 50 to move only in yz plane (see FIG. 5). The restraining member 51 is composed of a convex projection having a rectangular shape in cross section and extending in y direction, i.e. in the direction perpendicular to the direction in which the driven member 20 is driven. The projection fits in a groove 41 of concave portion formed on the base member 4 such that the base member 4 is prevented from moving in x direction. The groove 41 is also rectangular in cross section to be complementary with the projection and extends in y direction. The driving section 10 is held by the holder 50 to move only in yz plane (see FIG. 5) with the side planes of the restraining projection 51 formed on the holder 50 and side walls of the groove 41 being in sliding contact with each other.

The driven section 20 is supported by a linear guide (not shown) to move only in the directions indicated by a double headed arrow 82 in FIG. 4. The driven section 20 is driven in the direction shown by the double headed arrow 82 by means of the movement of the tip member 3 in the elliptic orbit 81 and the frictional force caused by the urging force in the direction shown by the arrow 73.

As the convex projection of the restraining member 51 formed on the holder 50 for holding the driving section 10 is fitted in the concave groove 41 formed on the base member 4 to prevent the driving section from moving in the direction in which the driven section 20 is driven, the driving section 10 of the actuator is controlled not to swing unnecessarily.

In the second embodiment, the convex restraining member 51 formed on the holder 50 which holds the driving section 10, is fitted in the concave groove formed on the base member 4. The present invention is not limited to that structure but may take various structures. For example, a convex projection may be formed on the base member 4 and may be fitted in a concave groove formed on the holder 50. This alternative arrangement attains the same result as is done by the second embodiment.

In the second embodiment, the tip member 3 is in press contact with the driven section 20 from outside thereof. The present invention is not limited to that structure but may be modified in various way. For example, the tip member 3 of the driving section 10 may be in press contact with the driven section 20 from inside thereof. This alternative arrangement attains the same result as is done by the second embodiment.

In the first and second embodiments, the driving section 10 is line-symmetric with respect to a line parallel with the y axis, and the two planes of the base member 4 which are in contact with the restraining member 51, are provided in the vicinity of the line or axis of symmetry. This is because the amount of displacement of the driving section 10 is minimum in the vicinity of the line or axis of symmetry. All the components of the driving section 10 are subject to elastic deformation, and the base member 4 also deforms in accordance with the deformation of the first and second piezoelectric elements 1 and 2. Upon designing the actuator, it is favorable to simulate the oscillation of the entire actuator 10. However, it is more realistic to simulate the oscillation of the driving section 10 only. FIGS. 8 through 11 shows exemplary outcome of the simulation of the deformation of the driving section 10.

Figure 8:
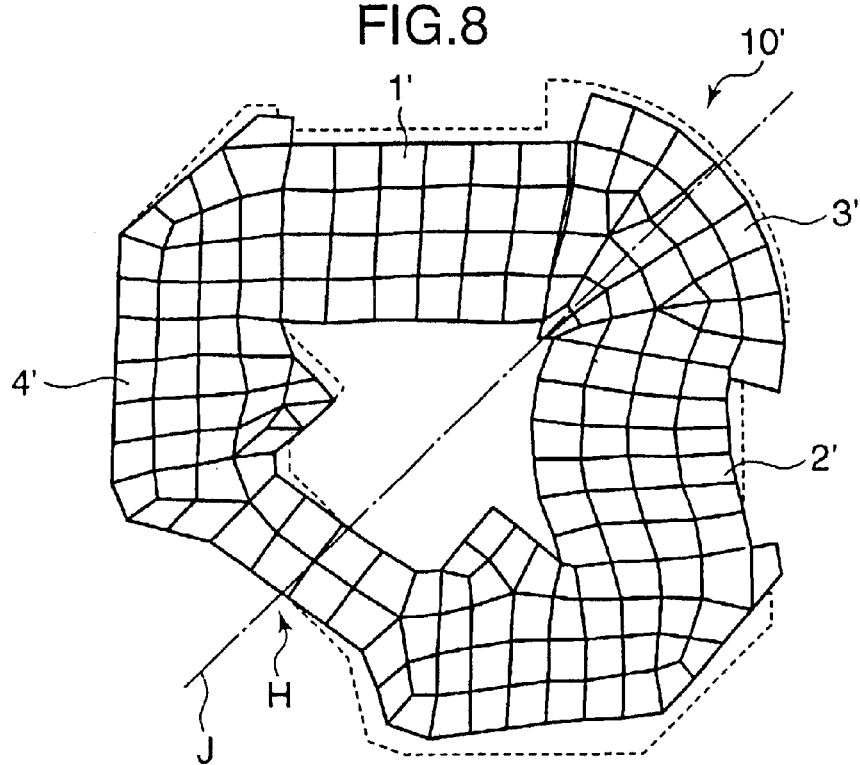
FIG. 8 illustrate deformation of the actuator of the first embodiment at certain time point.
Figure 9:
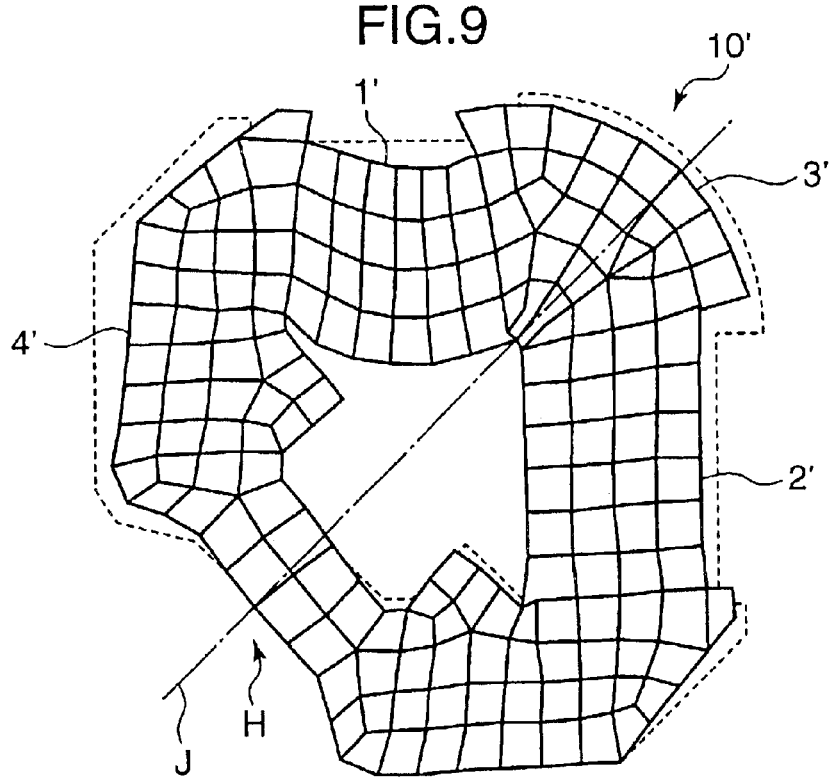
FIG. 9 illustrate deformation of the actuator of the first embodiment at a time when a tip member advances by one-quarter of its elliptic orbit from the state shown in FIG. 8.
Figure 10:
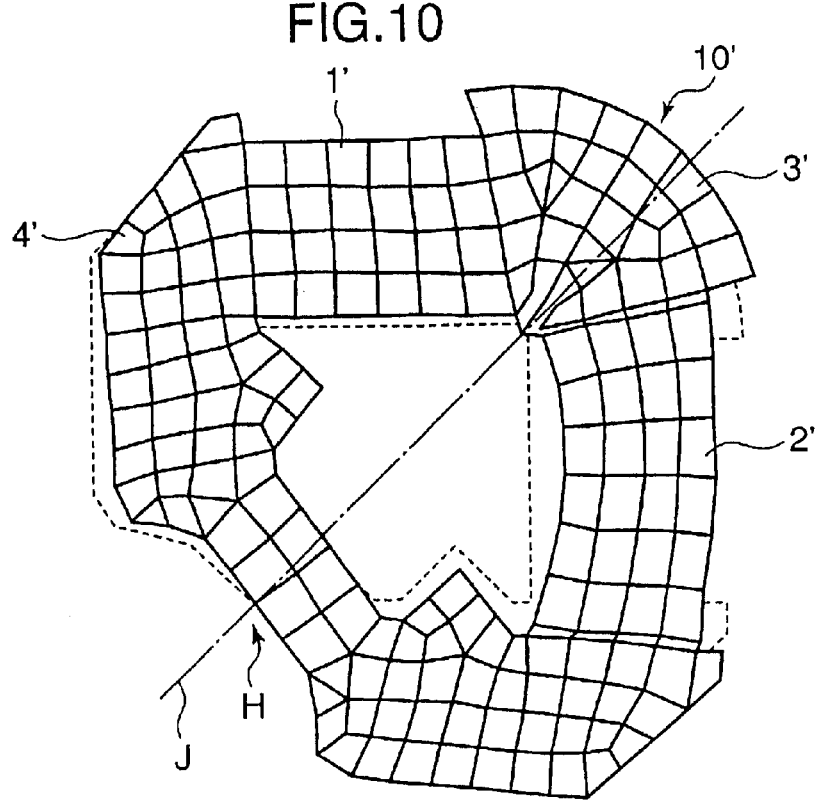
FIG. 10 illustrate deformation of the actuator of the first embodiment at a time when a tip member advances by one-half of its elliptic orbit from the state shown in FIG. 8.
Figure 11:
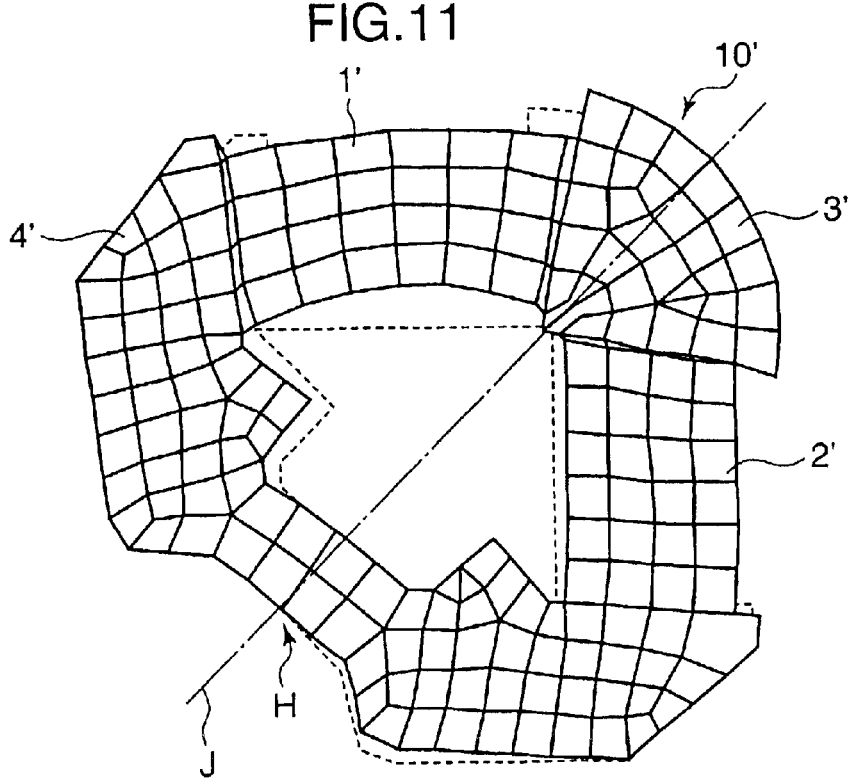
FIG. 11 illustrate deformation of the actuator of the first embodiment at a time when a tip member advances by three-quarters of its elliptic orbit from the state shown in FIG. 8.

FIG. 8 illustrate deformation of the actuator of the first embodiment at certain time point. FIG. 9 illustrate deformation of the actuator of the first embodiment at a time when a tip member advances by one-quarter of its elliptic orbit from the state shown in FIG. 8. FIG. 10 illustrate deformation of the actuator of the first embodiment at a time when a tip member advances by one-half of its elliptic orbit from the state shown in FIG. 8. FIG. 11 illustrate deformation of the actuator of the first embodiment at a time when a tip member advances by three-quarters of its elliptic orbit from the state shown in FIG. 8. In FIGS. 8 through 11, the broken line shows the driving section 10' at stationary state, while the solid line shows the driving section 10' at oscillating state. Also in FIGS. 8 through 10, the same reference numerals are used with prime for the parts and components corresponding to the parts and components shown in FIG. 2. For example, the part denoted by primed numeral 1' in FIGS. 8 through 10, corresponds to the first piezoelectric member 1, the part 2' corresponds to the second piezoelectric member 2, the part 3' corresponds to the tip member 3 and the part 4' corresponds to the base member 4.

As the deformation of the driving section 10' proceeds from the state of FIG. 8 to that of FIG. 11, the tip member part 3' moves in a elliptic orbit in the clockwise direction as viewed toward the plane of the sheet of the drawing. As shown in FIGS. 8 through 11, the amount of deformation is minimum (approximately zero) at the portion of the base member part 4' of the driving section in the vicinity H of the axis of symmetry J. Accordingly, if the driving section 10 shown in FIG. 2 is held at a position where the amount of deformation of the driving section 10 is minimum, i.e. at a position on the axis of symmetry of the driving section 10, then, the effect to the oscillation of the driving section 10 is minimum for the holding of the driving section 10. As an alternative, the driving section 10 may be held in the vicinity of the axis of symmetry within a range where the effect of the oscillation of the driving section 10 is negligible in relation with the characteristics of the actuator 100. If the driving section 10 is held at a position where the amount of deformation of the driving section 10 is large, the effect to the oscillation of the driving section 10 can not be avoided, and the actual driving condition differs largely from the simulation. In addition, the oscillation is transmitted to the position where the driving section is held, thereby causing energy loss. According to the embodiment described above, the retraining member 51 of the actuator 100 is provided at or in the vicinity of the position where the amount of deformation of the driving section is minimum (approximately zero) so that the driving force is transmitted to the driven section 20 without disturbing the function of retraining the driving section 10 to move only in necessary directions, and at the same time, without disturbing the oscillation of the driving section in substance, thereby attaining high-efficiency driving of the driven section 20.

It is to be noted that, although, FIGS. 8 through 11 show the driving condition of the driving section 10 according to the first embodiment shown in FIG. 1 through 3, the driving section 10 shows similar operation when it is applied to the second embodiment shown in FIGS. 4 through 7.

(Third Embodiment)

Figure 12:
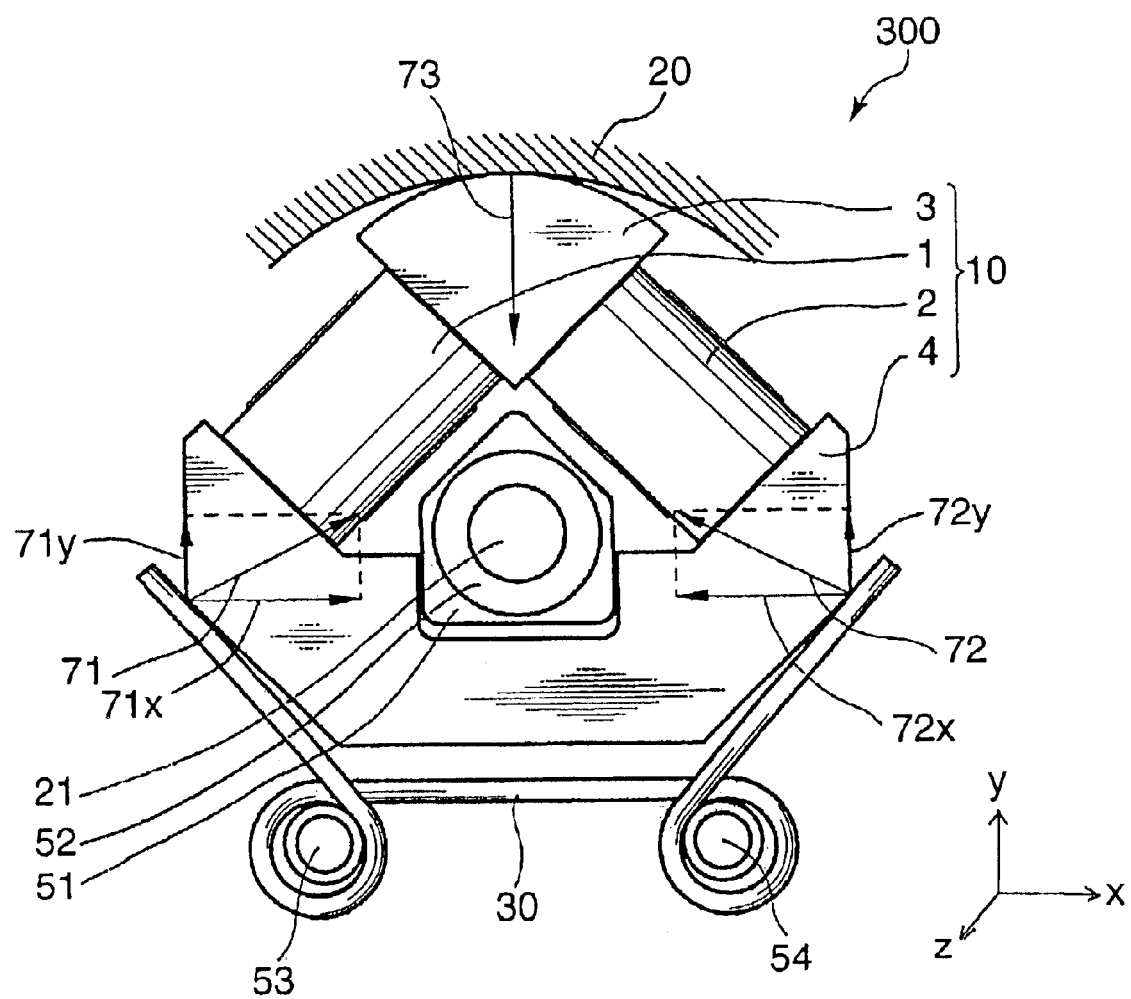
FIG. 12 is a plan view of the actuator according to a third embodiment of the present invention with its driven section and restraining member being removed.
Figure 13:
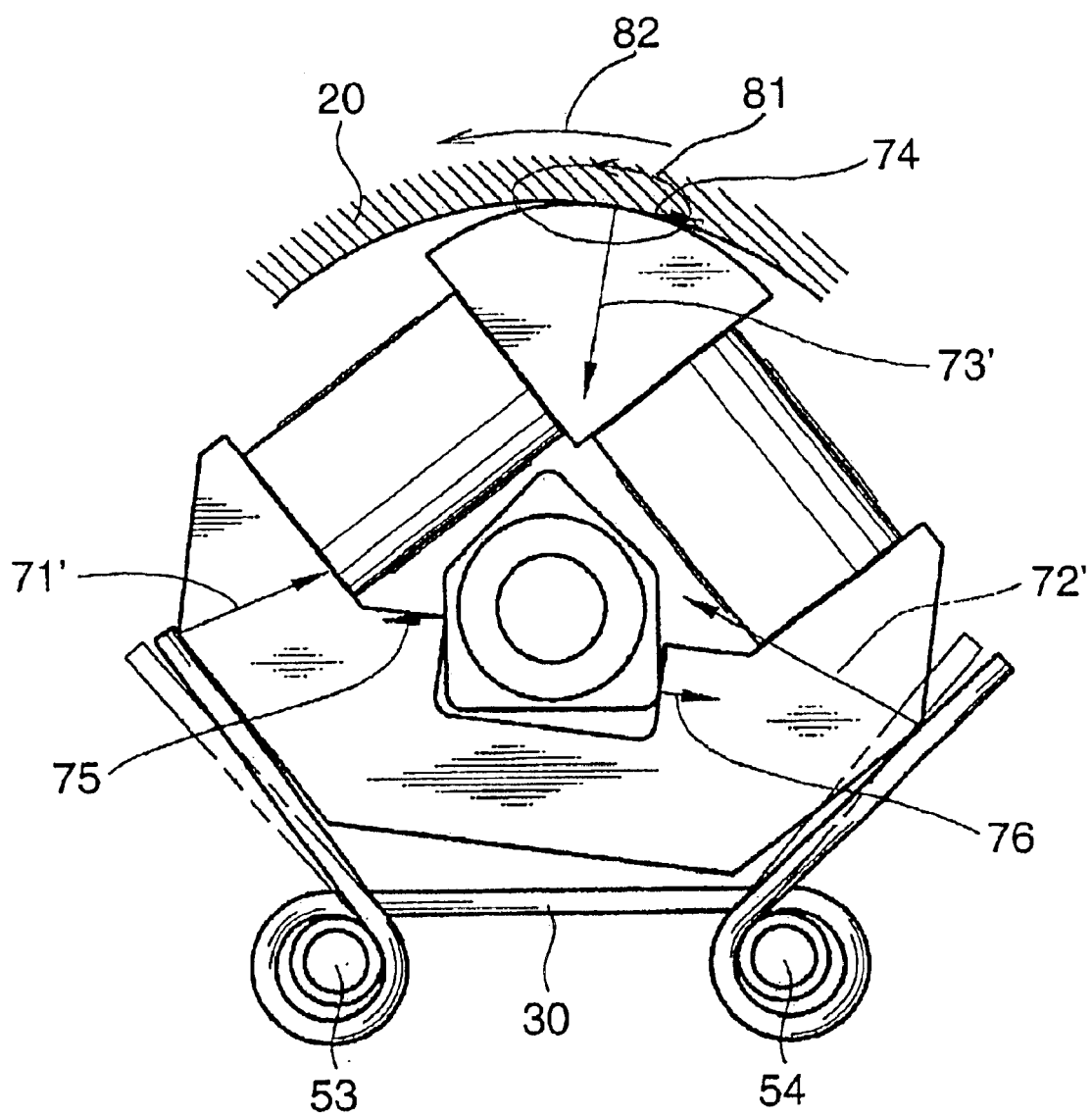
FIG. 13 illustrates operation of the actuator shown in FIG. 12.

Referring to FIGS. 12 and 13, explanation will be made about the third embodiment of the present invention. FIG. 12 is a plan view of the actuator according to a third embodiment of the present invention with its restraining member 40 being removed. FIG. 13 illustrates operation of the actuator shown in FIG. 12. In FIGS. 12 and 13, the driven section 20 is schematically illustrated partially for the portion to be in contact with the tip member 3. In FIG. 12, x axis shows the direction in which a driven section is driven at an contact point where the driven section is in contact with a tip member. "y" axis shows the direction passing through the contact point and an axis of rotation of the driven section. "z" axis shows the direction of axis of rotation of the driven section.

The actuator 300 according to the third embodiment has substantially the same structure as the actuator 100 according to the first embodiment. They are different in the structure of the torsion coil spring and its guide pin of the urging section 30. In FIGS. 12 and 13, the same or like reference numerals are used for the parts or members which are the same or correspond to the parts or members shown in FIGS. 1 through 3, and explanation will be made in the followings only for the portions or structures of the third embodiment that are different from those of the first embodiment.

The urging section 30 of the third embodiment is composed of a torsion coil spring 30 having two coil portions respectively fitted on guide pins 53 and 54, and two arms abutting against opposite sides of the base member 4. As shown in FIG. 12, the urging section 30 applies, to the base member 4, forces in the direction as shown by arrows 71 and 72 when the actuator 300 is stationary, i.e. when the driven section 20 does not receive driving force. As the result, driving section 10 is urged against inner side of the driven section 20 with a predetermined pressure and receives, from the driven section 20, force as shown by the arrow 73.

The forces 71 and 72 exerted by the urging section 30 are respectively resolved into x direction and y direction components 71x, 71y, 72x and 72y. As seen in FIG. 12, component forces 71x and 72x act in the direction of the frictional force (direction of x axis in FIG. 12) acting when the tip member 3 drives the driven section 20, and the component forces 71x and 72x balance with each other. Also as seen in FIG. 12, the component forces 71y and 72y act in the direction in which the tip member 3 presses the driven section 20 (the direction of y axis in FIG. 12), and the component forces 71y and 72y balance with each other. When the actuator 300 shown in FIG. 12 is driven, the tip member 3 moves in the elliptic orbit as shown in FIG. 13 to drive the driven section 20 in the direction shown by the arrow 82. As the result, the tip member 3 receives from the driven section 20, a frictional force in the direction shown by the arrow 74.

At this time, it is likely to occur that the driving section 10 swings by the frictional force, in the direction where the driven section 20 is driven, i.e. in the direction of x axis, due to the frictional force when the restraining member 51 and the base member 4 loosely fit each other with larger clearance as shown in FIG. 13, although such problem do not occur when the restraining member 51 and the base member 4 fit with each other without clearance. The same phenomena will occur when the driven section 20 receives an external force. To cope with such problem, in the actuator 300 of the third embodiment, the opposite side planes of the base member 4 are urged by the two arms of the urging section 30. With this structure, when the driving section 10 swings in a direction, the arm of the urging section 30 on the side of the swinging is twisted more than the arm on the opposite side thereby applying larger force to the driving section 10 in the direction shown by arrow 72'. At the same time, the driving section 10 receives smaller force to its opposite side from the opposite arm in the direction shown by arrow 71'. (see FIG. 13) Accordingly, as the urging force of the urging section 30 is applied to the driven section 20 in the driven direction, the driving section 10 that swings for some cause, will return to its neutral position by itself when the cause is removed. If the driving section 10 tends to swing more largely, the driving section 10 receives larger force to return it to its neural position to prevent excessive swing of the driving section 10 as shown in FIG. 13.

Although the driving section 10 receives other forces such as the reactive force of the restraining member 51 (shown by arrows 75 and 76 in FIG. 13) and other resolved component forces as the force in the direction of x axis or the torgue around the axis of rotation, those forces are small in comparison with the force received from the urging section 30.

When the driving section 10 swings largely, the force will be smaller with the same angular amount of twisting, as the force acting on the opposite side of the base member 4 in the direction shown by arrow 71' is applied to the base member 4 at the end portion of the arm of the spring 30. The force acting on the swing side of the base member 4 in the direction shown by arrow 72' is applied to the base member 4 at the base portion of the arm of the spring 30 so that the driving section 10 receives larger force with the same angular amount of twisting of the arm.

(Fourth Embodiment)

Figure 14:
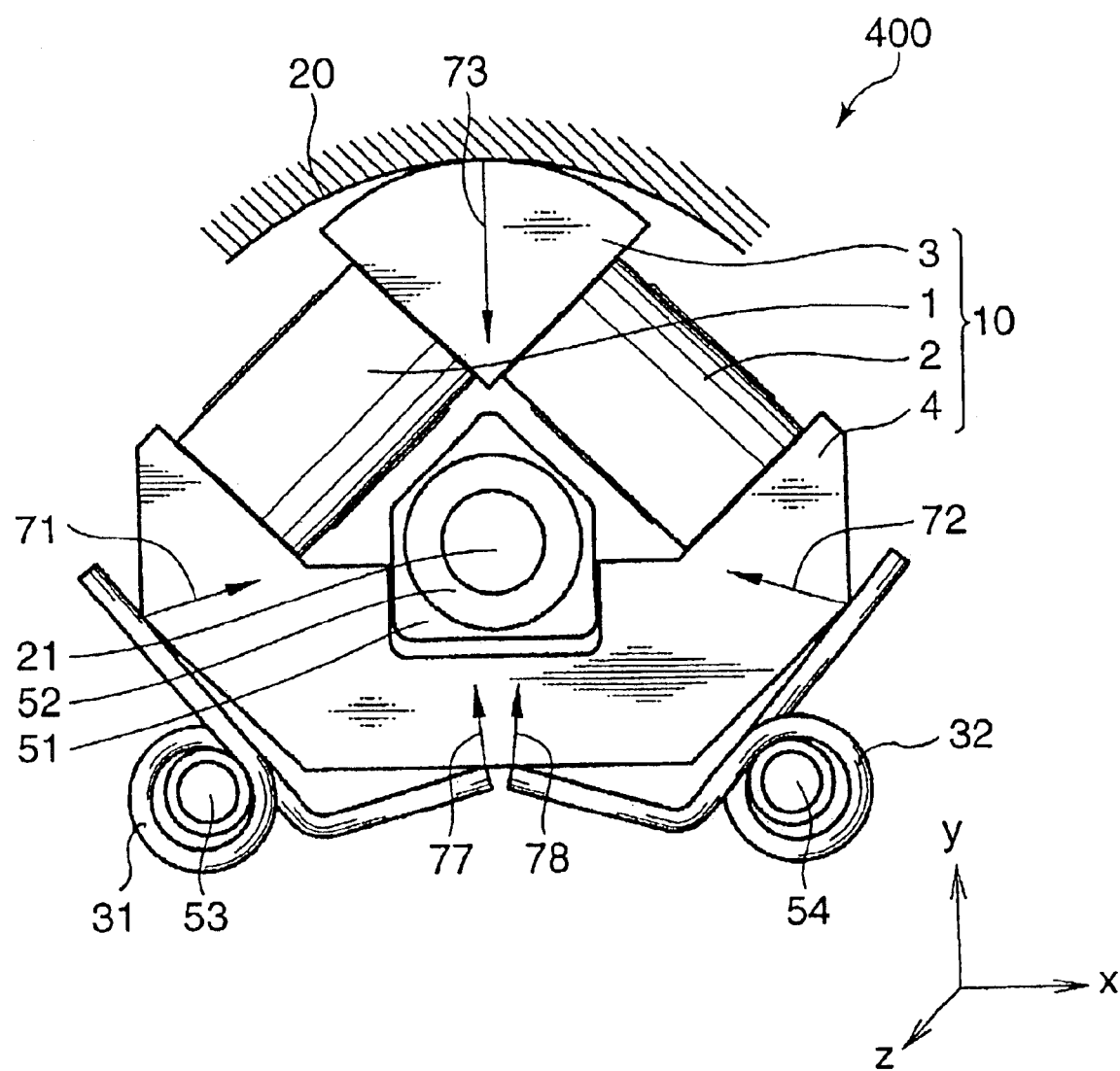
FIG. 14 is a plan view of the actuator of a fourth embodiment of the present invention with its driven section and restraining member being removed.
Figure 15:
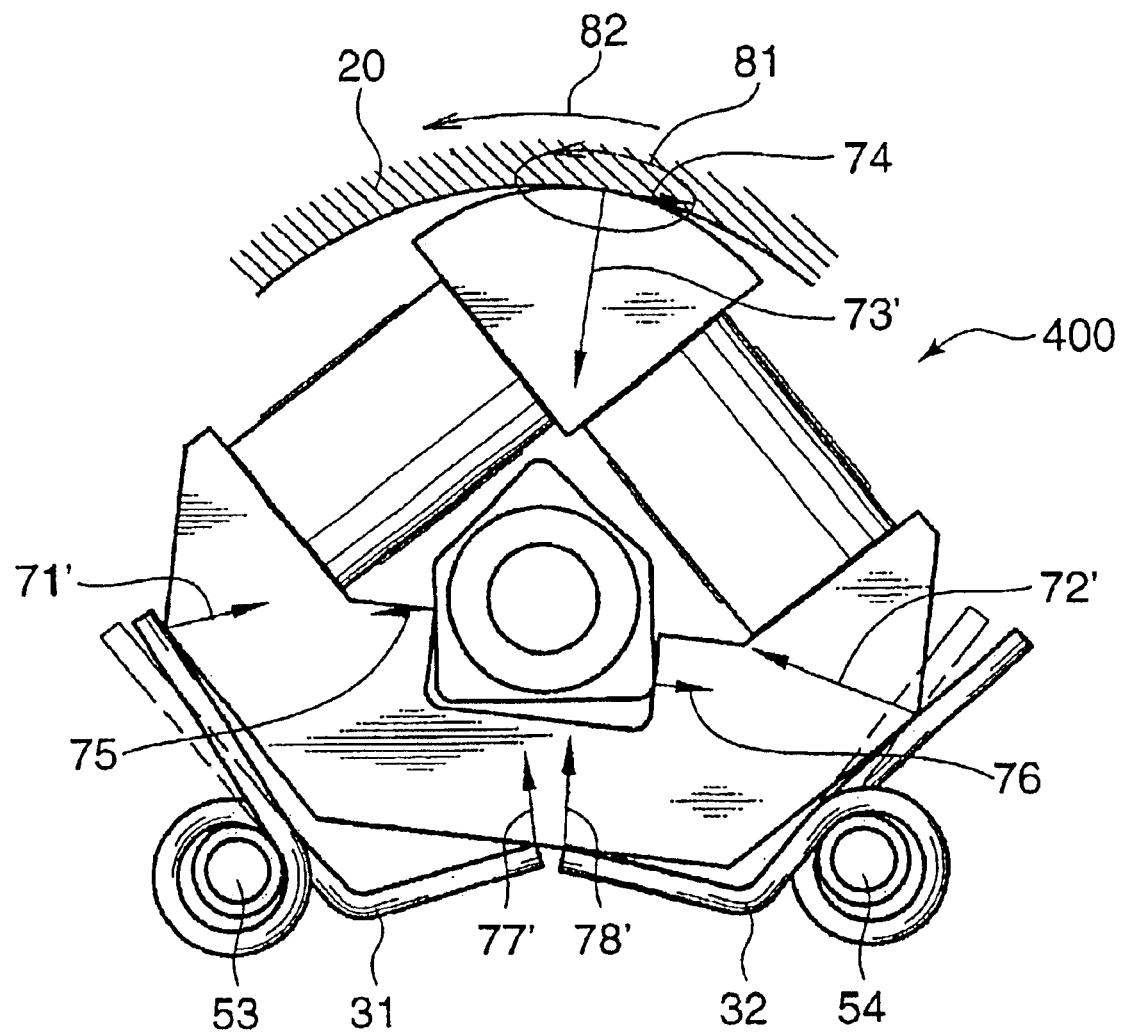
FIG. 15 illustrates operation of the actuator shown in FIG. 14.

Referring to FIGS. 14 and 15, explanation will be made about an actuator according to a fourth embodiment of the present invention. FIG. 14 is a plan view of the actuator of a fourth embodiment of the present invention with its restraining member 40 being removed. FIG. 15 illustrates operation of the actuator shown in FIG. 14. In FIGS. 14 and 15, the driven section 20 is schematically illustrated partially for the portion to be in contact with the tip member 3. In FIG. 14, "x" axis shows the direction in which a driven section is driven at a contact point where the driven section is in contact with a tip member. "y" axis shows the direction passing through the contact point and an axis of rotation of the driven section. "z" axis shows the direction of axis of rotation of the driven section.

The actuator 400 according to the fourth embodiment has substantially the same structure as the actuator 300 according to the third embodiment. They are different in the number of the torsion coil spring of the urging section 30. In FIGS. 14 and 15, the same or like reference numerals are used for the parts or members which are the same or correspond to the parts or members shown in FIGS. 12 and 13, and explanation will be made in the followings only for the portions or structures of the fourth embodiment that are different from those of the third embodiment.

The urging section according to the fourth embodiment is composed of a first urging section 31 and a second urging section 32 which respectively take forms of torsion coil springs in the embodiment. The coil portion of the first urging section 31 is fitted on a guide pin 53 which is integrally formed on the holder (not shown). One of two arms of the first urging section 31 is arranged to abut against a side plane of the base member 4 while the other arm is arranged to abut against a bottom side of the base member 4. The coil portion of the second urging section 32 is fitted on a guide pin 54 which is integrally formed on the holder (not shown). One of two arms of the second urging section 32 is arranged to abut against a side plane of the base member 4 while the other arm is arranged to abut against a bottom side of the base member 4. As shown in FIG. 14, the first urging section 31 applies, to the base member 4, forces in the direction as shown by arrows 71 and 77 when the actuator 400 is stationary, i.e. when the driven section 20 does not receive driving force. At that time, the second urging section 32 applies, to the base member 4, forces in the direction as shown by arrows 72 and 78. As the result, driving section 10 is urged against inner side of the driven section with a predetermined pressure and receives, from the driven section 20, force as shown by the arrow 73.

In this structure, the compositions of the forces generated by the first urging section 31 in the directions shown by the arrows 71 and 77 balance with the compositions of the forces generated by the second urging section 32 in the directions shown by the arrows 72 and 78. When the actuator 400 shown in FIG. 14 is driven, the tip member 3 moves in the elliptic orbit as shown in FIG. 15 to drive the driven section 20 in the direction shown by the arrow 82. As the result, the tip member 3 receives from the driven section 20, a frictional force in the direction shown by the arrow 74.

At this time, it is likely to occur that the driving section 10 swings, in the direction where the driven section 20 is driven, i.e. in the direction of x axis, due to the frictional force, when the restraining member 51 and the base member 4 loosely fit each other with larger clearance for some reason as shown in FIG. 15, although such problem do not occur when the restraining member 51 and the base member 4 fit with each other without clearance as in the case of the first and second embodiments. The same phenomena will occur when the driven section 20 receives an external force.

To cope with such problem, in the actuator 400 of the fourth embodiment, the opposite side planes of the base member 4 are urged by the first and second urging sections 31 and 32. With this structure, when the driving section 10 swings in a direction, the arms of the urging section 30 on the side of the swinging are twisted more than the arms on the opposite side thereby applying larger forces to the driving section 10 in the directions shown by arrows 72' and 78'. At the same time, the driving section 10 receives smaller force to its opposite side from the opposite arms in the direction shown by arrows 71' and 77'. (see FIG. 13) Accordingly, as the urging force of the urging section 30 is applied to the driven section 20 in the driven direction, the driving section 10 that swings for some cause, will return to its neutral position by itself when the cause is removed. If the driving section 10 tends to swing more largely, the driving section 10 receives larger force to return it to its neural position, thereby preventing excessive swing of the driving section 10 as shown in FIG. 15.

Although the driving section 10 receives other forces such as the reactive force of the restraining member 51 (shown by arrows 75 and 76 in FIG. 15) and other resolved component forces as the force in the direction of x axis or the torgue around the axis of rotation, those forces are small in comparison with the force received from the first and second urging sections 31 and 32.

When the driving section 10 swings largely, the force receiving from the first urging section 31 in the direction shown by arrow 71' is applied to the base member 4 at the end portion of the arm of the spring 31 so that the force will be smaller with the same angular amount of twisting. The force receiving from the second urging section 32 in the direction shown by arrow 72' is applied to the base member 4 at the base portion of the arm of the spring 32 so that the driving section 10 receives larger force with the same angular amount of twisting of the arm.

(Fifth Embodiment)

Figure 16:
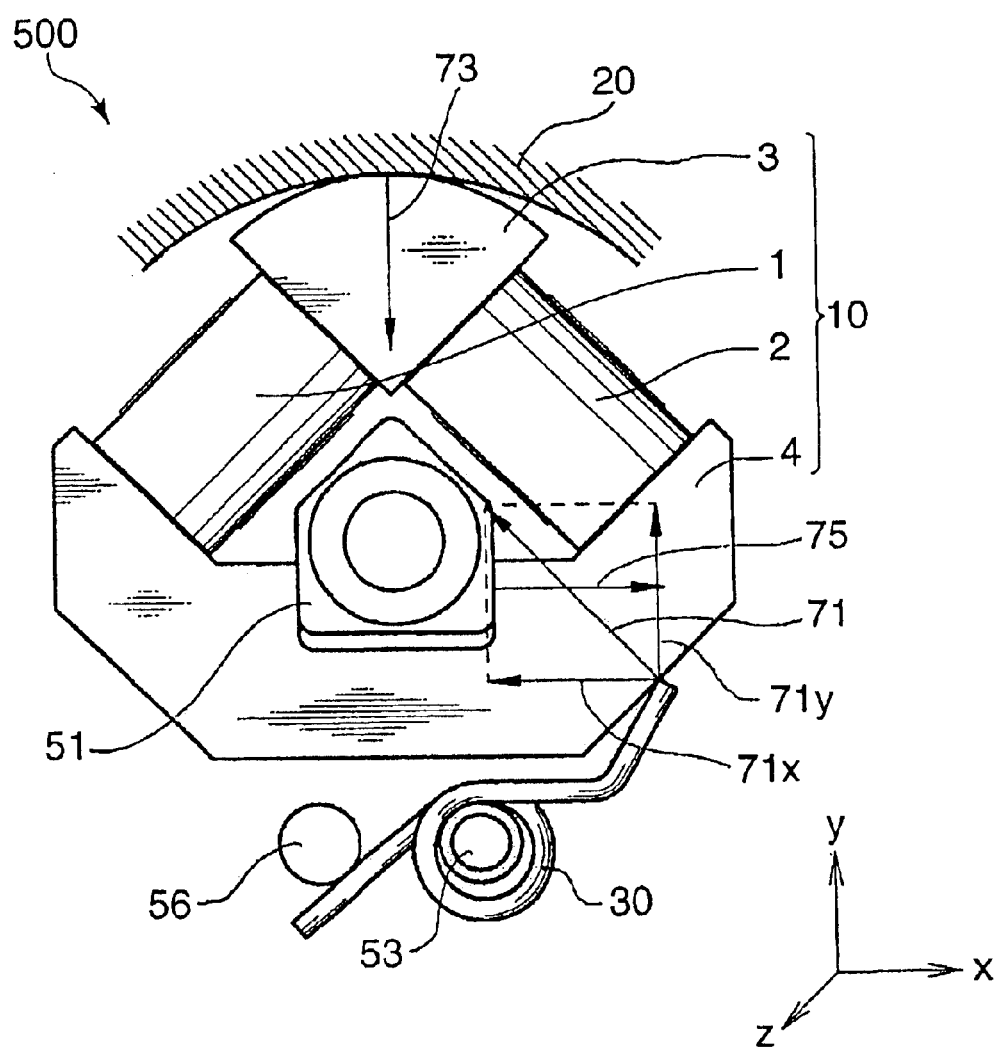
FIG. 16 is a plan view of the actuator of a fifth embodiment of the present invention with its driven section and restraining member being removed.
Figure 17:
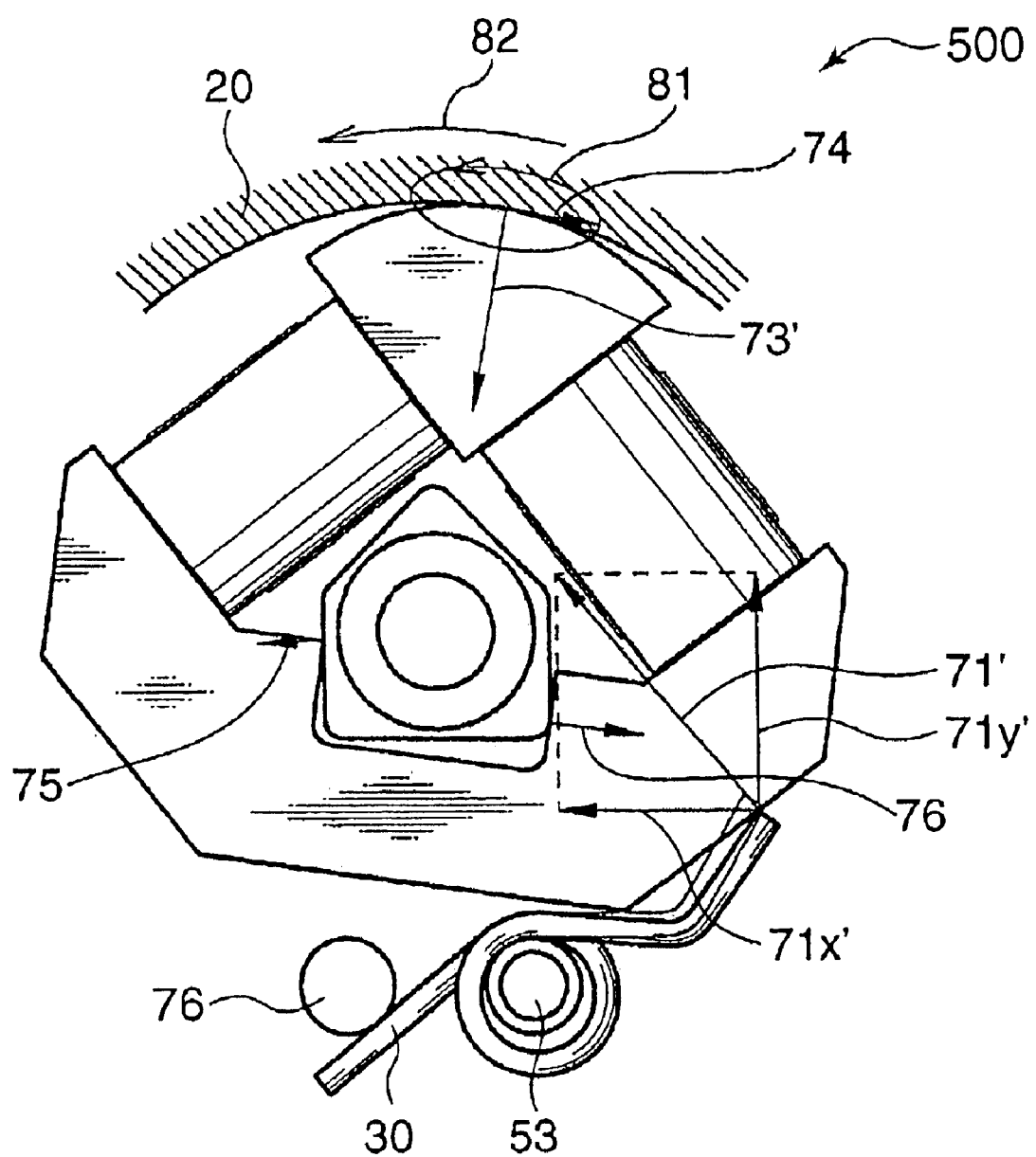
FIG. 17 illustrates operation of the actuator shown in FIG. 16.

Referring to FIGS. 16 and 17, explanation will be made about an actuator according to a fifth embodiment of the present invention. FIG. 16 is a plan view of the actuator of the fifth embodiment of the present invention. FIG. 17 illustrates operation of the actuator shown in FIG. 16. In FIGS. 16 and 17, the driven section 20 is schematically illustrated partially for the portion to be in contact with the tip member 3. In FIG. 16, "x" axis shows the direction in which a driven section 20 is driven at a contact point where the driven section 20 is in contact with a tip member 3. "y" axis shows the direction passing through the contact point and an axis of rotation of the driven section 20. "z" axis shows the direction of axis of rotation of the driven section 20.

The actuator 500 according to the fifth embodiment has substantially the same structure as the actuator 300 according to the third embodiment. They are different in the number of the forces which the torsion coil spring of the urging section 30 exert on the driving section 30. In FIGS. 16 and 17, the same or like reference numerals are used for the parts or members which are the same or correspond to the parts or members shown in FIGS. 12 and 13, and explanation will be made in the followings only for the portions or structures of the fifth embodiment that are different from that of the first embodiment.

The urging section 30 according to the fifth embodiment of the present invention is composed of a torsion coil spring having a coil portion and two arms. The coil portion is fitted on a guide pin 53 formed on the holder 50 (not shown in the Figure but the same as the holder of the aforementioned embodiments). One of the two arms abuts against a side plane of the base member 4, while the other of the arms is retained by a retaining pin 56 which is integrally formed on the holder 50. As shown in FIG. 16, when the actuator 400 does not receive external force and is stationary, the urging section 30 applies, to the base member, a force in the direction shown by the arrow 71, with the driving section 10 being urged in the upper-left direction as seen in the FIG. 16. As the result, the driving section 10 is in press contact with the inner side of the driven section 20 with a predetermined pressure and receives from the driven section 20 a force in the direction shown by the arrow 73.

The force exerted by the urging section 30 in the direction shown by the arrow 73 is resolved into component forces in the directions of x axis and y axis shown by the arrows 71x and 71y. As shown in FIG. 16, the component force shown by the arrow 71x acts in the direction of the frictional force acting when the tip member 3 drives the driven section 20, i.e. in the direction of x axis. The driving section 10 is biased leftwards by the component of the force acting in the direction shown by the arrow 71 i.e. the component force shown by the arrow 71x, and receives, from the restraining member 51, reactive force shown by an arrow 75. Thus, in the actuator 500, the urging forces applied by the urging section 30 is not laterally symmetric. When the actuator 500 shown in FIG. 16 is driven, the tip member 3 moves in the elliptic orbit 81 to drive the driven section 20 in the direction shown by the arrow 82. As the result, the tip member 3 receives, from the driven section 20, a frictional force in the direction shown by the arrow 74.

At this time, it is likely to occur that the driving section 10 swings, in the direction where the driven section 20 is driven, i.e. in the direction of x axis, due to the frictional force when the restraining member 51 and the base member 4 loosely fit each other with larger clearance for some reason as shown in FIG. 17, although such problem do not occur when the restraining member 51 and the base member 4 fit with each other without clearance as in the case of the first and second embodiments. The same phenomena will occur when the driven section 20 receives an external force. To cope with such problem, in the actuator 500 of the fifth embodiment, the bottom plane of the base member 4 is urged by the one arm of the urging section 30.

With this structure, when the driving section 10 swings in a direction, the arm of the urging section 30 on the side of the swinging is twisted more thereby applying larger forces to the driving section 10 in the directions shown by the arrow 71'. Accordingly, as the urging force of the urging section 30 is applied to the driven section 20 in the driven direction, the driving section 10 that swings for some cause, will return to its neutral position by itself when the cause is removed. If the driving section 10 tends to swing more largely, the driving section 10 receives larger force to return it to its neural position, thereby preventing excessive swing of the driving section 10 as shown in FIG. 17. The structure that the urging section 30 urges the driving section 10 from one side, is effective in the case where the driven section is driven only in one direction, e.g. in the counter-clockwise direction as shown by the arrow 82 in FIG. 17 in the fifth embodiment.

Although the urging section 30 urges the lower-right side of the base member 4 in upper-left direction in the actuator 500 shown in FIG. 16, the present embodiment is not limited to that arrangement but may be modified in various ways. For example, the actuator 500 may be arranged such that the urging section 30 urges the lower-left side of the base member 4 in upper-right direction. The last mentioned arrangement is effective in the case where the driven section is driven in the clockwise direction i.e.-in the reverse direction from that shown by the arrow 82 in FIG. 17.

The actuator of the present invention may be used for various apparatus and devices. As an example of such applications, explanation will be made below for the case where the actuator is used for driving a surveillance camera.

Figure 18:
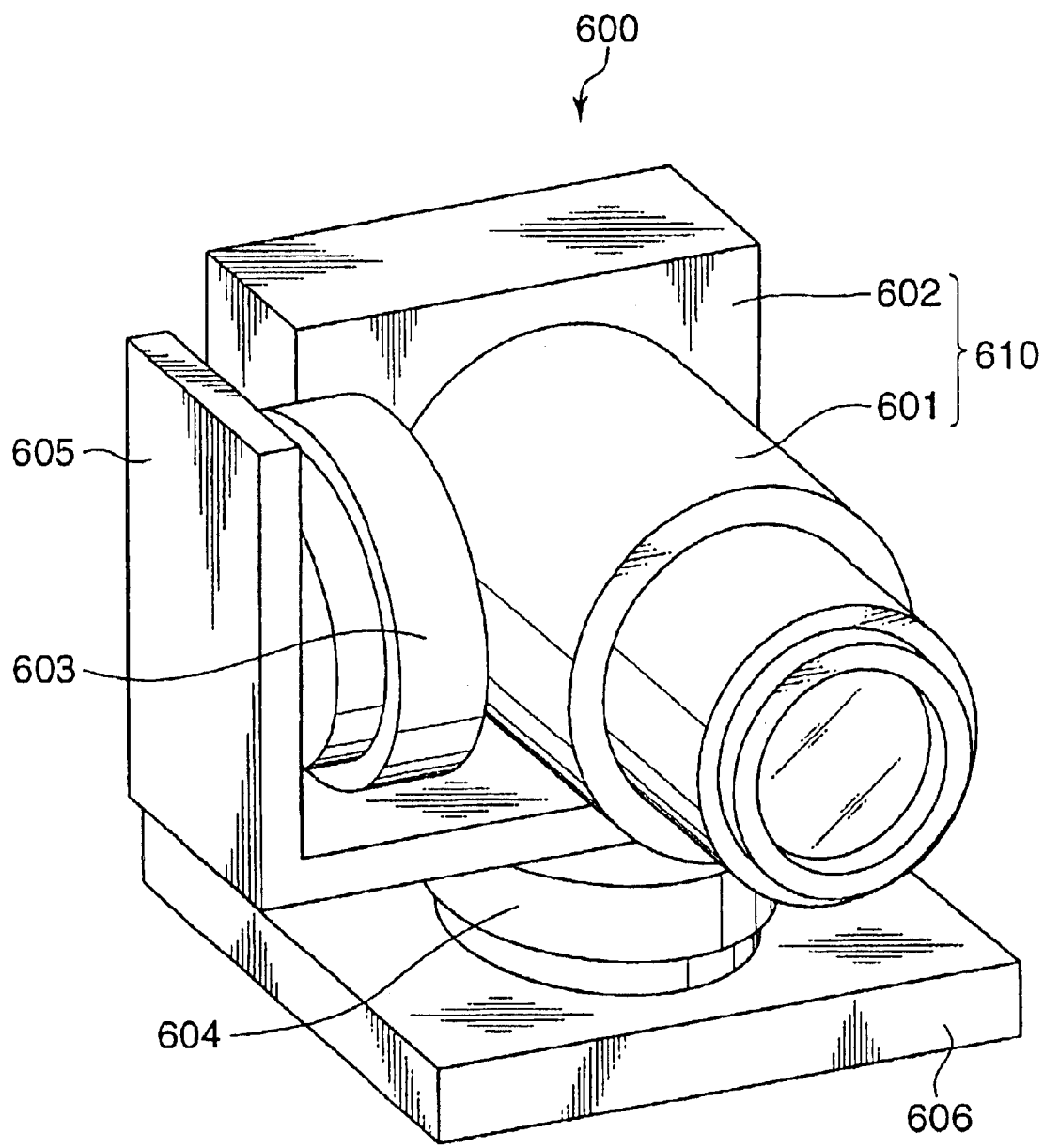
FIG. 18 shows a camera driven by the actuator according to the first, third, fourth or fifth embodiment.
Figure 19:
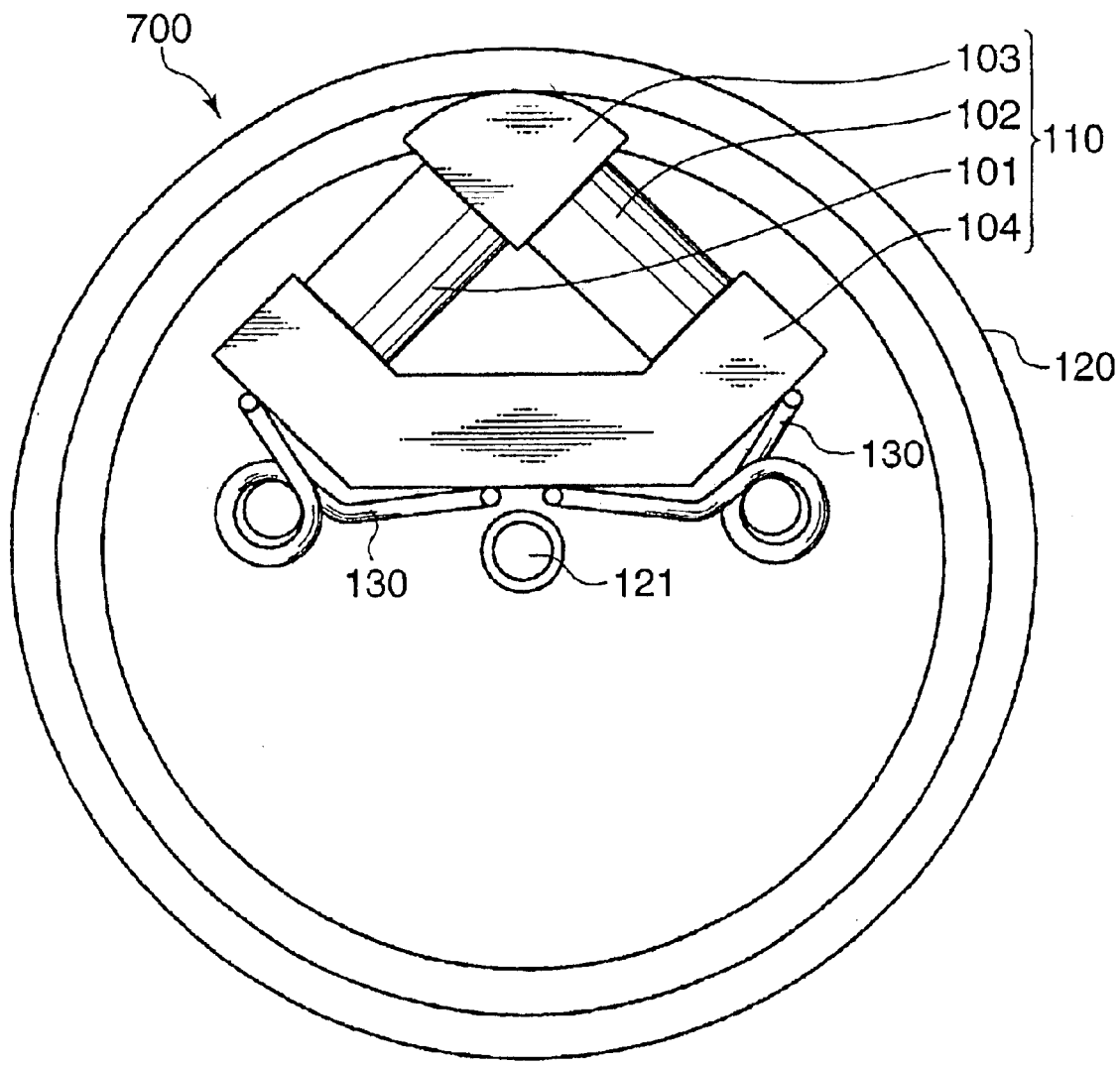
FIG. 19 illustrates structure of a conventional actuator.
Figure 20:
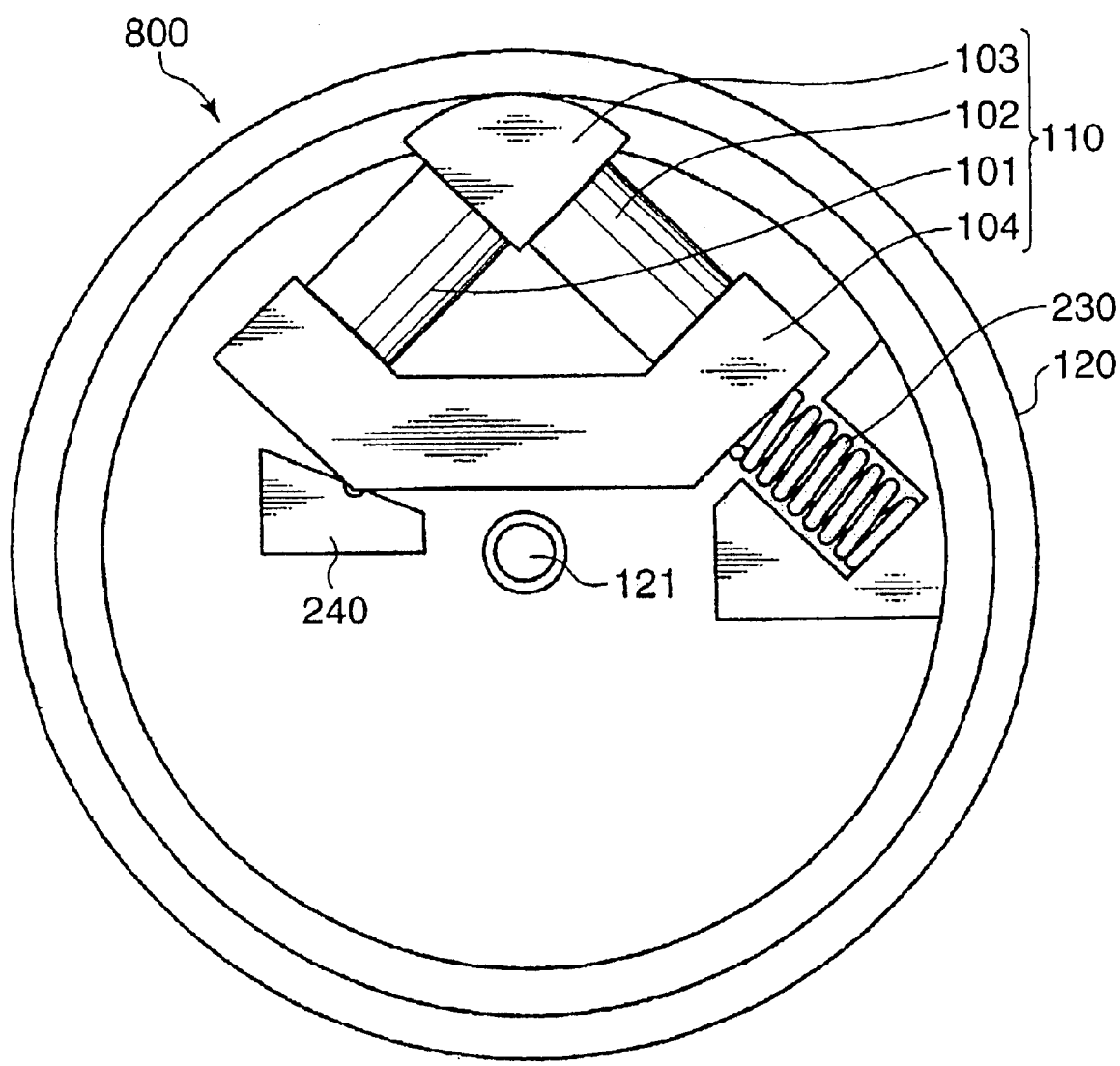
FIG. 20 illustrates structure of another conventional actuator.

FIG. 18 schematically illustrate a surveillance camera arrangement wherein the camera is panned and tilted by any of the actuators 100, 300 and 400 according to the first, third, fourth and fifth embodiments. In the following description of the surveillance camera, the reference numerals used for the explanation of the actuators of the embodiments are used for the parts and components of the actuators for driving the camera.

A surveillance camera 600 comprises an objective lens barrel 601 incorporating an objective lens and a diaphragm mechanism for adjusting a diaphragm aperture for the control of amount of light passing through the objective lens, an image sensor 602 for photo-electrically converting an image of an object formed by the objective lens and outputting image signal, a tilting drive unit 603 for tilting the les barrel 601 and the image sensor 602, and panning drive unit 604 for panning the les barrel 601 and the image sensor 602. The objective lens may include a focusing lens group and a zoom lens group. A picture taking section 610 for taking pictures of objects to be photographed, is composed of the lens barrel 601 and the image sensor 602. The picture taking section 610 is supported on a camera supporting base plate 605 through the tilting drive unit 603. The camera supporting base plate 605 is supported by a platform 606 through the panning drive unit 604. In other words, the picture taking section 610 and the camera supporting base plate 605 are respectively fixed on rotational shafts of the tilting and panning drive units 603 and 604, corresponding to the rotational shaft 20 of the actuator 100, 300 or 400, and the holders for the tilting and panning drive units 603 and 604 corresponding to the holder 50 of the actuator 100, 300 or 400 are fixedly mounted respectively on the camera supporting base plate 605 and the platform 606.

The image sensor 602 includes for example CCD (Charge Coupled Device). The tilting drive unit 603 is composed of any of the actuators 100, 300 and 400 which have a rotatable driven section 20, and drives the picture taking section 610 in tilting direction. The holder for the tilting drive unit 603 is fixedly mounted on the camera supporting base plate 605, the shaft 21 of the driven section 20 is fixed on the lens barrel 601. When driven section or rotor of the actuator of the tilting drive unit 603 is driven in a predetermined rotational direction, the picture taking section 610 turns in a predetermined direction to make scanning of view in tilting direction. The panning drive unit 604 includes an actuator having a structure same as that of any of the actuators 100, 300 and 400 of which driven section 20 is rotatable, and the panning drive unit 604 drives the picture taking section 610 in panning direction. The holder 50 of the panning drive unit 604 is fixedly mounted on the platform 606 and the camera supporting base plate 605 is fixed on the shaft 21 of the driven section 20. When the driven section of the actuator rotates in a predetermined direction, the picture taking section 610 also turns in a predetermined direction to make scanning of view in the panning direction.

Conventional surveillance camera are driven by an electric motor and gears for the scanning of view in panning and tilting directions. If the actuator according to any of the aforementioned embodiments is employed for the scanning drive, larger torque is obtained for the size of the driving mechanism, thereby accomplishing compactness of the camera arrangement.

In the last mentioned embodiment, the actuators are employed for driving a surveillance camera, but the application of the actuator is not limited to that. For example, the actuators may be used for panning and tilting of Web camera or PC camera. A single actuator may be used for either panning or tilting of the camera.

Further, the application of the actuator of the present invention is not limited to the driving of the camera but the actuator may be used for tilting and or panning driving of light emitting element such as laser or LED, or display device.

In the embodiments, laminated type piezoelectric members are employed as the displacing members. The present invention is not limited to that, but may employ series connection of a single layer piezoelectric element and elastic metal member which provides large amount of displacement by resonance of the elastic member using the piezoelectric element as a driving source.

In the embodiments, the tip member 3 is driven by a pair of piezoelectric members 1 and 2 which function as electromechanical members. The present invention is not limited to that structure. For example, other electromechanical members may be employed. In addition, the number of the electro mechanical members is not limited to two, but may be more. In that case, more than two members may be connected to displacement composing member such as the tip member of the embodiment, or may be linked with each other.

From the above-mentioned embodiments are derived various aspects of the present invention such as followings;
(1) An actuator comprising a driving section including a plurality of displacing sections for respectively generating predetermined displacements, a composing section connected to one ends of the displacing sections for composing the displacements of the displacing sections, and a fixing section for fixing the other ends of the displacing sections; a driven section driven by the driving force transmitted from the driving section; an urging section for making press contact between the driving section and driven section; and a restraining member for preventing the driving section from moving in the direction in which the driven section is driven. According to this aspect of the invention, the driven section of the actuator is driven by the driving section with the driving section being prevented from moving in the direction in which the driven section is driven, thereby insuring stable operation of the actuator.
(2) The actuator described in (1) wherein the fixing section deforms with the displacements of the displacing sections, and the restraining section is arranged at the position or in the vicinity of the position where the amount of the deformation of the fixing section is minimum, with the restraining section restraining the driving section from moving in the direction in which the driven section is driven.
With this arrangement, the movement of the driving section in the driven-section driven direction is restrained by the restraining section which is located at the position or in the vicinity of the position where the amount of the deformation of the fixing section is minimum. Accordingly, unnecessary swinging of the driving section is prevented without affecting the driving of the displacing sections.
(3) The actuator described in (1) or (2) wherein the driven section includes a rotor, a shaft integrally formed with the rotor for the rotation of the rotor around the shaft, and a shaft supporter for supporting the shaft allowing its rotation with the rotor, and the restraining section is integrally formed with the shaft supporter.
With this arrangement, the driving section can be compact in size and of high density with respect to the arrangement of the component.
(4) The actuator described in (3) wherein the restraining section is located between the composing section and the fixing section.
With this arrangement, the driving section can be compact in size and of high density with respect to the arrangement of the component.
(5) The actuator described in (1) or (2) wherein the fixing section is formed with concave groove, and the restraining section includes a convex projection fitted in the concave groove.
With this arrangement, unnecessary swinging of the driving section is prevented without affecting the driving of the displacing sections.
(6) The actuator described in any of (1) through (5) wherein the urging section is arranged to apply urging force to the driving section in the direction in which the driven section is driven.
With this arrangement, the driving section may return to its original position even if it swings in a direction.
(7) A camera comprising a picture taking section for taking picture of an object to be photographed, a tilting drive unit for driving the picture taking section in a tilting direction, and a panning drive unit for driving the picture taking section in a panning direction, and wherein the tilting unit and the panning unit respectively include a actuator as described in (1) through (5).
According to this arrangement, the camera is panned and tilted by the actuator of the present invention with larger torque as compared with the size of the driving mechanism and entire arrangement of the camera and its driving mechanism may be compact in size.

Having described our invention as related to the embodiments shown in the accompanying drawing, it is our intention that the invention be not limited by any of the details of description, unless otherwise specified, but rather be construed broadly within its spirit and scope as set out in the accompanying claims.

What is claimed is:
1. An actuator comprising:
 a driving section including a plurality of electromechanical displacing sections for respectively electromechanically generating predetermined displacements, a composing section connected to one ends of the displacing sections for composing the displacements of the displacing sections, and a fixing section for fixing the other ends of the displacing sections;
 a driven section driven by the driving force transmitted from the driving section;

an urging section for making press contact between the driving section and driven section; and a restraining member for preventing the driving section from moving in the direction in which the driven section is driven, the fixing section deforming with the displacements of the displacing sections, wherein the restraining member is arranged to abut against a surface in the vicinity of the axis of symmetry of a base member of the fixing section, and the restraining member is arranged at the position or in the vicinity of the position where the amount of the deformation of the fixing section is minimum.

2. The actuator according to claim 1 wherein the driven section is arranged to move linearly.

3. The actuator according to claim 1 wherein the driven section is arranged to rotate.

4. The actuator according to claim 3 wherein the driven section includes a rotor having a cylindrical portion and a shaft for multi-turn rotational support of the cylindrical portion; and the composing section of the driving section is in press contact with an inner side of the cylindrical portion.

5. The actuator according to claim 3 wherein the driven section includes a sector portion and the composing section of the driving section is in press contact with the arc side of the sector portion.

6. The actuator according to claim 3 wherein the driven section further includes a rotational shaft, and the restraining member is integrally formed with a shaft supporter which supports the rotating shaft allowing its rotation with the rotor.

7. The actuator according to claim 6 wherein the restraining member is located between the composing section and the fixing section.

8. The actuator according to claim 3 wherein the fixing section is formed with concave groove, and the restraining member includes a convex projection fitted in the concave groove.

9. The actuator according to claim 1 wherein the urging section is arranged to urge the driving section in the direction in which the driven section is driven.

10. A camera assembly including a camera body and the actuator according to claim 1, wherein the camera body is driven by the actuator for panning.

11. The camera assembly according to claim 10, wherein the camera body is driven by the actuator for tilting.

12. A camera assembly including a camera body and the actuator according to claim 1, wherein the camera body is driven by the actuator for tilting.

13. An actuator comprising:

a driving section including a pair of piezoelectric members respectively having elongated shape, each piezoelectric member being displaceable in response to an electric signal applied thereto, a tip member connected to one ends of the piezoelectric members to be driven by the piezoelectric members by the composition of the displacements of the piezoelectric members, and a base member connected with the other ends of the piezoelectric members;

The a driven section driven by the driving force transmitted from the driving section through the tip member;

The an urging section for making press contact between the tip member and driven section; and a restraining member for preventing the driving section from moving in the direction in which the driven section is driven, the base member being deformable with the displacements of the piezoelectric members, wherein the restraining member is arranged to abut against a surface in the vicinity of the axis of symmetry of the base member, and the restraining member is arranged at the position or in the vicinity of the position where the amount of the deformation of the base member is minimum.

14. The actuator according to claim 13 wherein the pair of piezoelectric members being driven at different phase to drive the tip member such that the tip member moves in elliptic orbit, and the driving force of the driving section is transmitted to the driven section through friction between the tip member and the driven section.

15. The actuator according to claim 14 wherein base member is formed with a rectangular cut-out and the restraining member having a pair of opposite sides and being fitted in the rectangular cut-out with its opposite sides being in sliding contact with opposite side walls of the cut-out, the opposite sides and side walls being substantially at right angle with the direction in which the driven section is driven.

16. The actuator according to claim 14, one of the restraining member and base member is formed with a projection extending in the direction perpendicular to the direction in which the driven section is driven, the projection having a rectangular shape in cross section, and the other of the restraining member and base member is formed with a groove extending in the same direction as the projection and having a cross sectional shape complementary with the projection such that the projection fits in the groove.

17. The actuator according to claim 13 wherein the urging section includes a torsion coil spring having a pair of arms abutting against the base member from the side opposite from the side where the base member is connected with the piezoelectric members.

18. The actuator according to claim 13 wherein the urging section includes a torsion coil spring having a pair of arms abutting against the base member to exert forces to the base member obliquely with respect to the direction in which the driven section is driven.

19. The actuator according to claim 18 wherein the pair of arms respectively engage the base member such that, when the base member swings in a direction, one of the arms in the swing side is twisted more than the other arm.

20. The actuator according to claim 16, wherein the driven section includes a cylindrical portion and a shaft co-rotatable with the cylindrical portion, and the actuator further comprises a holder having a shaft supporter for rotatably supporting the shaft, and the restraining member is formed integrally with the shaft supporter and arranged between the tip member and the base member.

* * * * *